(12) United States Patent
Tokuchi

(10) Patent No.: US 11,188,025 B2
(45) Date of Patent: Nov. 30, 2021

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 289 days.

(21) Appl. No.: 16/122,073

(22) Filed: Sep. 5, 2018

(65) Prior Publication Data

US 2019/0227489 A1 Jul. 25, 2019

(30) Foreign Application Priority Data

Jan. 23, 2018 (JP) .............................. JP2018-009005

(51) Int. Cl.
| | | |
|---|---|---|
| *G06K 9/00* | (2006.01) | |
| *G03H 1/02* | (2006.01) | |
| *G06K 9/32* | (2006.01) | |
| *G06F 1/16* | (2006.01) | |
| *G03H 1/00* | (2006.01) | |

(52) U.S. Cl.
CPC ............ *G03H 1/02* (2013.01); *G03H 1/0005* (2013.01); *G06F 1/163* (2013.01); *G06K 9/00389* (2013.01); *G06K 9/3241* (2013.01); *G03H 2001/0204* (2013.01); *G03H 2001/0216* (2013.01)

(58) Field of Classification Search
CPC .................. G03H 1/02; G03H 1/0005; G03H 2001/0204; G03H 2001/0216; G06K 9/00389; G06K 9/3241; G06F 1/163; G06F 3/042; G06F 3/011; G06F 3/017; G02B 30/56
See application file for complete search history.

(56) References Cited

U.S. PATENT DOCUMENTS

| | | | |
|---|---|---|---|
| 9,778,738 B2 | 10/2017 | Sugimoto et al. | |
| 2016/0219270 A1* | 7/2016 | Chen ..................... | G06F 3/0412 |
| 2019/0235737 A1* | 8/2019 | Kuribayashi ......... | G06F 3/0418 |

FOREIGN PATENT DOCUMENTS

| | | | |
|---|---|---|---|
| JP | 2013-109421 A | 6/2013 | |
| JP | 2014-157482 A | 8/2014 | |
| JP | 2017-062709 A | 3/2017 | |

\* cited by examiner

*Primary Examiner* — Tom Y Lu
(74) *Attorney, Agent, or Firm* — Oliff PLC

(57) ABSTRACT

An information processing apparatus includes a detector and a reception unit. The detector detects approaching of a user toward an image formed in midair. The reception unit receives an action of the user as an operation in a case where the user approaches the image from a predetermined direction.

14 Claims, 23 Drawing Sheets

T11

T12

T13

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-009005 filed Jan. 23, 2018.

BACKGROUND

Technical Field

The present invention relates to information processing apparatuses, information processing systems, and non-transitory computer readable media.

SUMMARY

According to an aspect of the invention, there is provided an information processing apparatus including a detector and a reception unit. The detector detects approaching of a user toward an image formed in midair. The reception unit receives an action of the user as an operation in a case where the user approaches the image from a predetermined direction.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Schematic Configuration of Aerial Display

Figure 1:
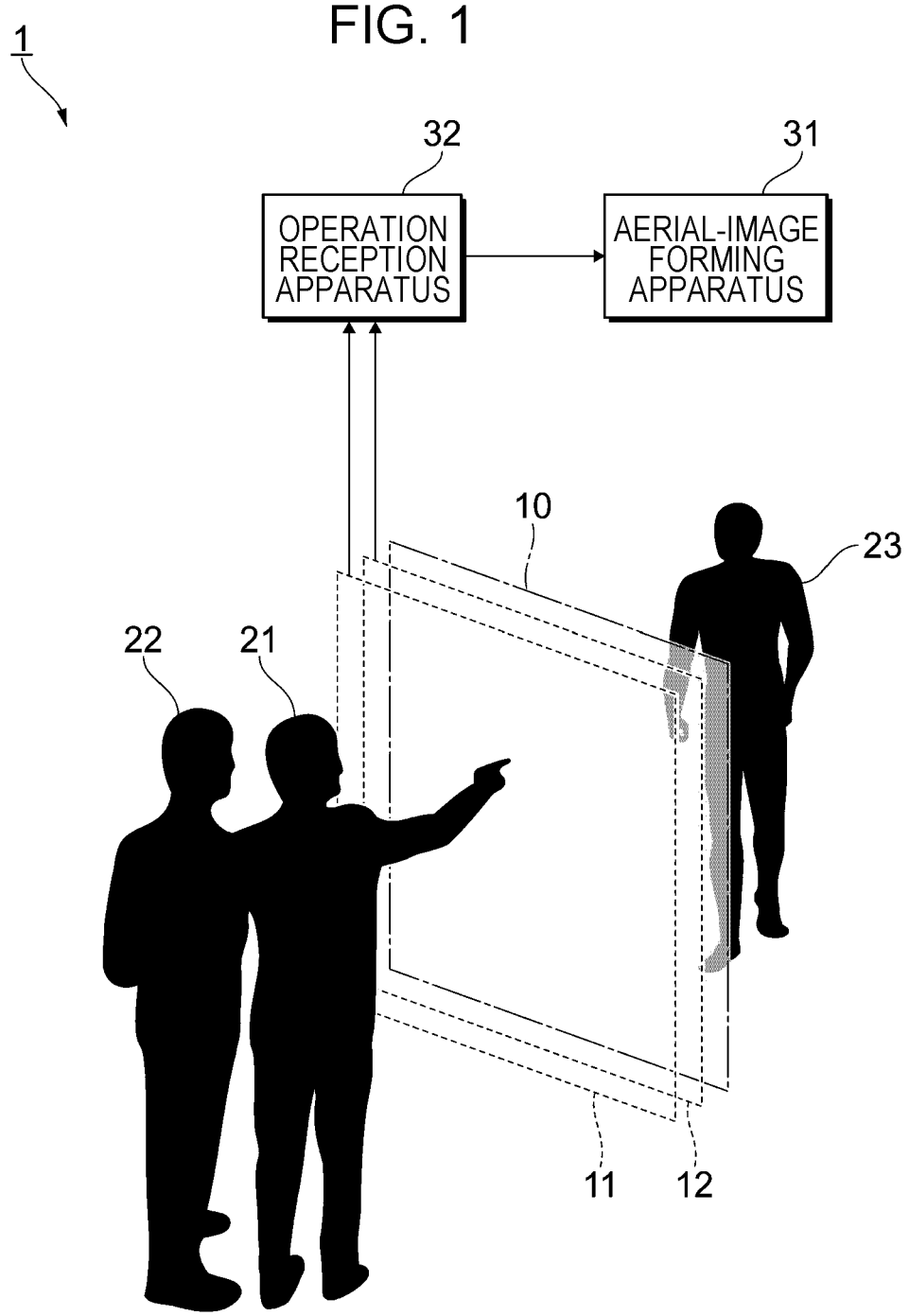
FIG. 1 schematically illustrates the configuration of an aerial-image forming system according to a first exemplary embodiment.

FIG. 1 schematically illustrates the configuration of an aerial-image forming system 1 according to a first exemplary embodiment.

In this exemplary embodiment, an aerial image 10 refers to an image formed in midair such that, for example, the state of light equivalent to reflection light from an object is reproduced in midair. Since the aerial image 10 is formed as if the image floats in midair, a person is capable of passing through the aerial image 10.

The aerial-image forming system 1 includes an aerial-image forming apparatus 31 that forms the aerial image 10 in midair, and also includes an operation reception apparatus 32 that receives an operation performed on the aerial image 10 by detecting the direction in which a person approaches the aerial image 10.

The aerial-image forming system 1 is an example of an information processing system, and the operation reception apparatus 32 is an example of an information processing apparatus. The aerial-image forming apparatus 31 is an example of an image forming apparatus.

FIG. 1 illustrates a case where three people are located within a space in which the aerial image 10 is formed.

In the case of FIG. 1, the aerial image 10, which is planar, is disposed in a passage through which people pass, and displays a guidance screen or an advertisement screen. Alternatively, the aerial image 10 may be an operation screen in which the display changes in response to an operation performed by a person. Therefore, the guidance screen or the advertisement screen whose display contents change in response to an operation is an example of an operation screen.

The aerial image 10 may either be a still image or a moving image.

Although the aerial image 10 has a rectangular shape in its entirety in each of the following exemplary embodiments, the shape that defines the outer edge of the aerial image 10 is not limited to a rectangular shape and may be a freely-chosen shape. For example, a space in which an image of an object is formed may be the entire space in which the aerial image 10 is formed. Examples of the aerial image 10 include an image of an operation button, an image of a person, an image of an animal, an image of a product, and an image of a fruit. Although the aerial image 10 is planar in FIG. 1, the aerial image 10 may have a three-dimensional shape, such as a curved shape, a spherical shape, or a cubical shape.

In the case of FIG. 1, a person 21 and a person 22 are located in front of the aerial image 10 (i.e., at the negative side in the Y direction with reference to the aerial image 10), whereas a person 23 is located behind the aerial image 10 (i.e., at the positive side in the Y direction with reference to the aerial image 10).

The person 21 is pointing his/her finger toward one part of the aerial image 10. The person 21 is an operator. The person 23 is walking toward the aerial image 10 to pass therethrough.

Because the aerial image 10 is an image formed in midair (i.e., because there is no physical projection screen or display device), it is possible to see through the aerial image 10 from one side (e.g., the position of the person 21) toward the other side of the aerial image 10 (e.g., the position of the person 23). Needless to say, it is also possible to see through the aerial image 10 from the rear side (e.g., the position of the person 23) toward the front side of the aerial image 10 (e.g., the position of the person 21). The transparency of the aerial image 10 varies depending on an image displayed thereon or the surrounding environment.

The person 21 to the person 23 are capable of checking the aerial image 10 from either side of the planar aerial image 10. Therefore, a touching operation may be performed from both faces of the planar aerial image 10.

In this exemplary embodiment, it is assumed that the aerial image 10 includes text characters. In this case, a relationship between the front face and the rear face occurs in the aerial image 10. In FIG. 1, the aerial image 10 viewed from the side where the person 21 is located will be defined as the front face. Therefore, the aerial image 10 viewed from the side where the person 23 is located is the rear face. On the rear face, the text characters are visually recognized as mirror text characters.

In this exemplary embodiment, an operation performed from the front face of the aerial image 10 is set as a reception target. Specifically, an operation performed by the person 21 or 22 is set as a reception target, and an operation performed by the person 23 is excluded from the reception target.

In order to differentiate an action as a reception target, optical detection planes 11 and 12 are provided in front of the aerial image 10. The detection planes 11 and 12 are used for detecting an object passing through the space in a non-contact fashion and are each formed of light having a wavelength not viewable by man (e.g., infrared light). Each of the detection planes 11 and 12 may also be used as a detection plane used for detecting the coordinates of an operated position.

In the case of this exemplary embodiment, the detection planes 11 and 12 are planar and are disposed parallel to the aerial image 10. The detection planes 11 and 12 are disposed away from the aerial image 10 by first and second predetermined distances, respectively.

Furthermore, in the case of this exemplary embodiment, the detection planes 11 and 12 each have an area larger than that of the aerial image 10. Alternatively, the detection planes 11 and 12 may each have an area smaller than that of the aerial image 10 so long as the area includes a region that displays buttons that receive an operation.

In this exemplary embodiment, the detection plane 11 is disposed at the far side from the aerial image 10, and the detection plane 12 is disposed at the near side of the aerial image 10. The detection plane 11 is an example of a first region, and the detection plane 12 is an example of a second region.

The detection plane 11 and the detection plane 12 are provided for distinguishing between approaching of a person intentionally performing an operation and approaching of a person unintentionally performing an operation.

For example, if only one of the detection plane 11 and the detection plane 12 is used, it is not possible to distinguish an operation performed from the front side (i.e., the front face) of the aerial image 10 and an operation performed from the rear side (i.e., the rear face) of the aerial image 10.

The occurrence of the detection planes 11 and 12 and the detection of an object passing through the detection planes 11 and 12 are executed by the operation reception apparatus 32.

Example of Aerial-Image Forming Apparatus

The principles of how the aerial image 10 is formed will now be described with reference to FIGS. 2A to 6. The principles to be described below are already known.

Figure 2A:
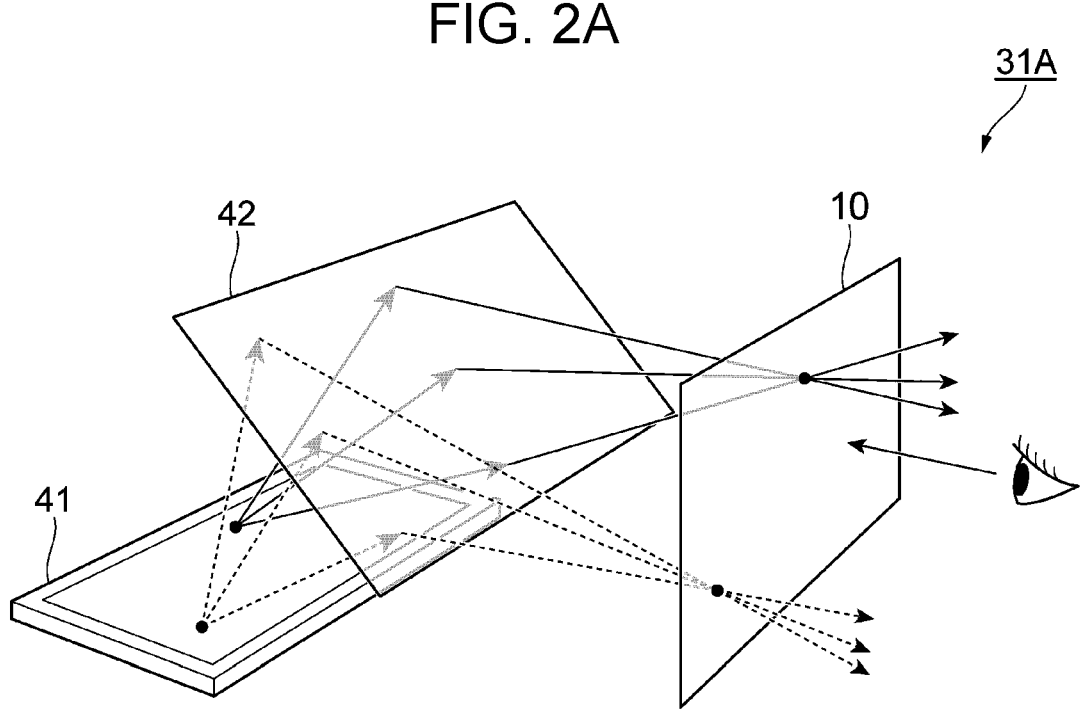
FIGS. 2A and 2B are principle diagrams of an aerial-image forming apparatus that forms an aerial image by causing light output from a display device to be transmitted through a dedicated optical plate, FIG. 2A illustrating the positional relationship between each component and the aerial image, FIG. 2B illustrating a part of the cross-sectional structure of the optical plate.
Figure 2B:
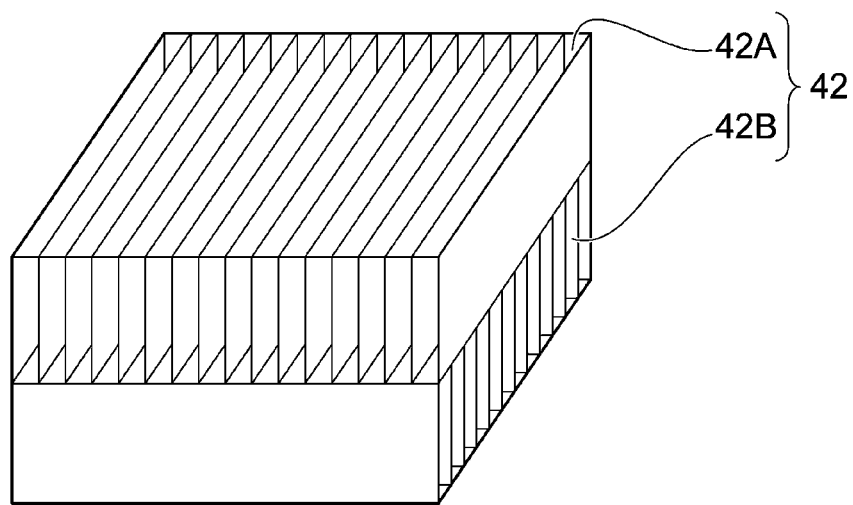

FIGS. 2A and 2B are principle diagrams of an aerial-image forming apparatus 31A that forms an aerial image 10 by causing light output from a display device 41 to be transmitted through a dedicated optical plate 42. Specifically, FIG. 2A illustrates the positional relationship between each component and the aerial image 10, and FIG. 2B illustrates a part of the cross-sectional structure of the optical plate 42.

The optical plate 42 has a laminated structure constituted of an upper plate having an array of glass strips 42A whose wall surfaces are used as mirrors and a lower plate having an array of glass strips 42B oriented orthogonally to the glass strips 42A.

The optical plate 42 causes the light output from the display device 41 to be reflected twice by the glass strips 42A and 42B so that an image of the light is formed in midair, whereby an image displayed on the display device 41 is reproduced in midair. The distance between the display device 41 and the optical plate 42 is equal to the distance between the optical plate 42 and the aerial image 10. Moreover, the size of the image displayed on the display device 41 is equal to the size of the aerial image 10.

Figure 3:
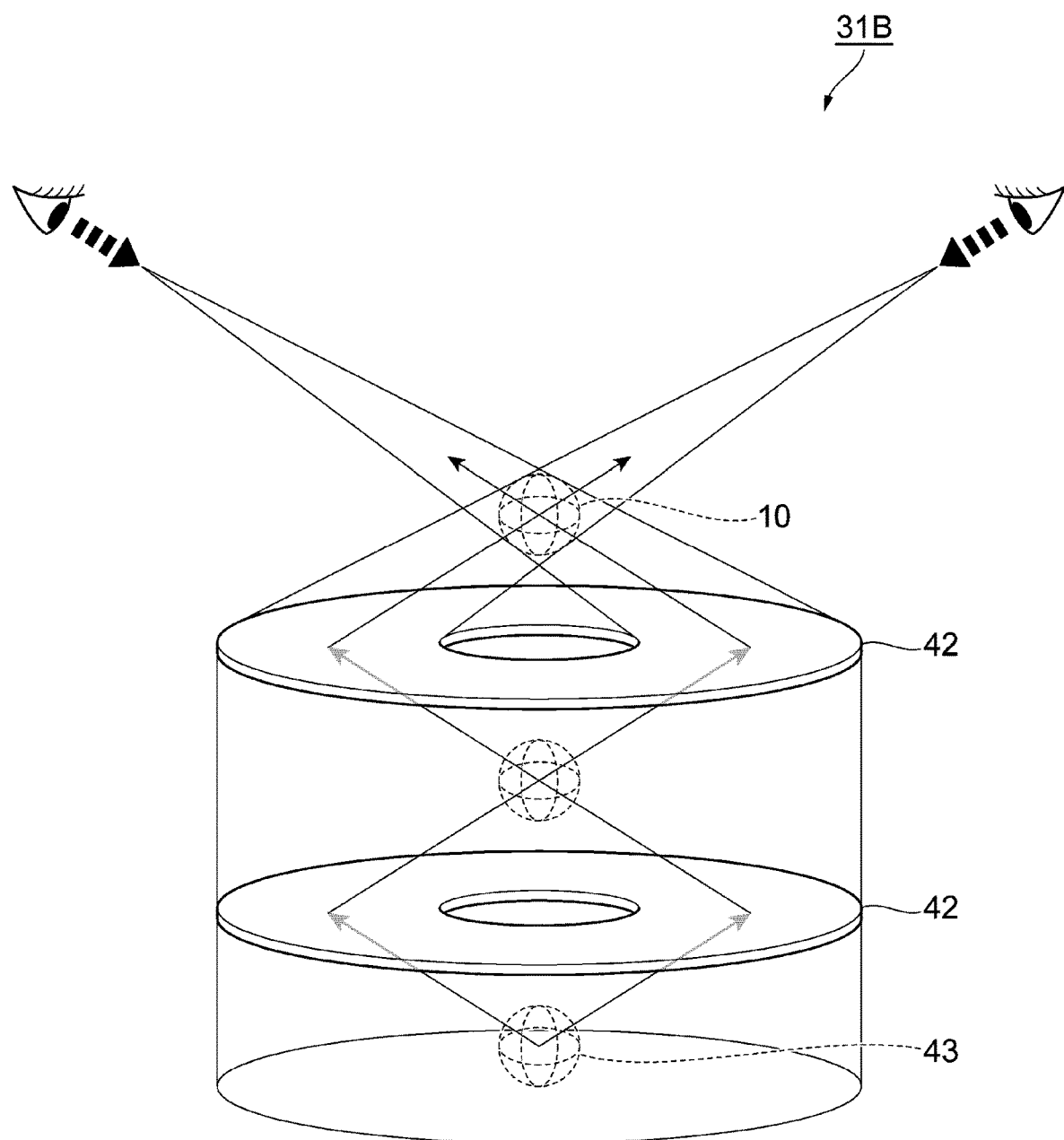
FIG. 3 is a principle diagram of an aerial-image forming apparatus that forms a three-dimensional image as the aerial image.

FIG. 3 is a principle diagram of an aerial-image forming apparatus 31B that forms a three-dimensional image as the aerial image 10. The aerial-image forming apparatus 31B causes light reflected by the surface of an actual object 43 to be transmitted twice through ring-shaped optical plates 42, so as to reproduce a three-dimensional image in midair. The optical plates 42 do not have to be arranged in series.

Figure 4A:
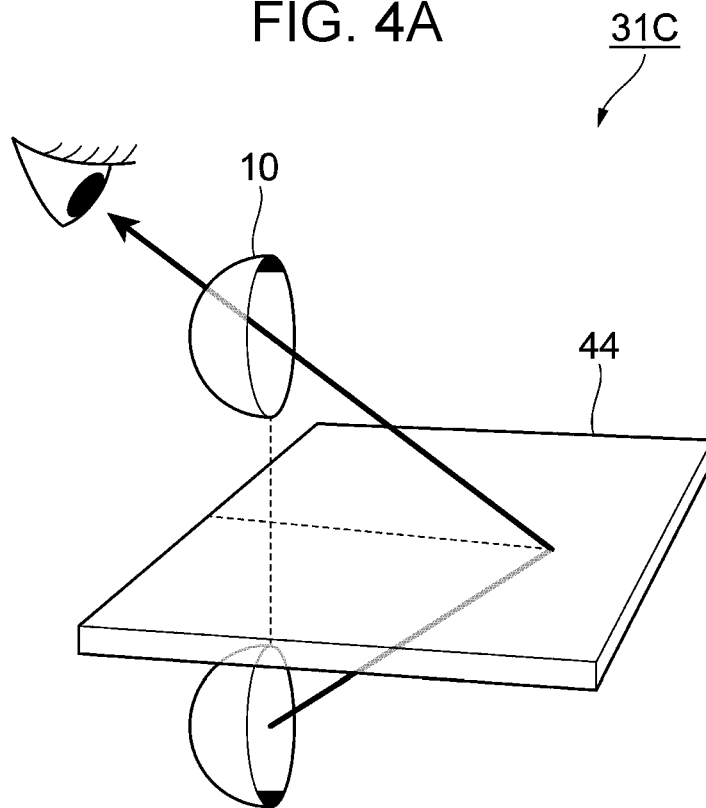
FIGS. 4A and 4B are principle diagrams of an aerial-image forming apparatus that forms an aerial image by using a micro mirror array having micro square holes that constitute a dihedral corner reflector and that are evenly arranged within a plane, FIG. 4A illustrating the positional relationship between each component and the aerial image, FIG. 4B being an enlarged view of a part of the micro mirror array.
Figure 4B:
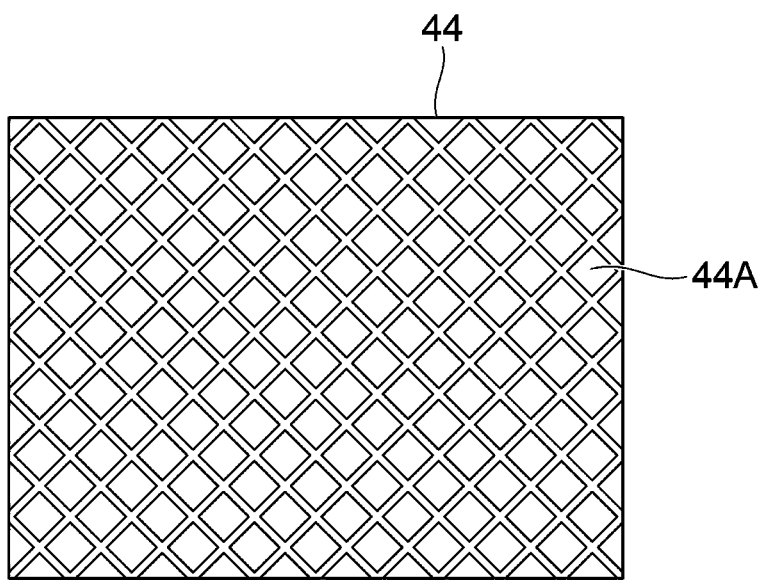

FIGS. 4A and 4B are principle diagrams of an aerial-image forming apparatus 31C that forms an aerial image 10 by using a micro mirror array 44 having micro square holes 44A that constitute a dihedral corner reflector and that are evenly arranged within a plane. Specifically, FIG. 4A illustrates the positional relationship between each component and the aerial image 10, and FIG. 4B is an enlarged view of a part of the micro mirror array 44. Each of the holes 44A has, for example, 100 μm sides.

Figure 5:
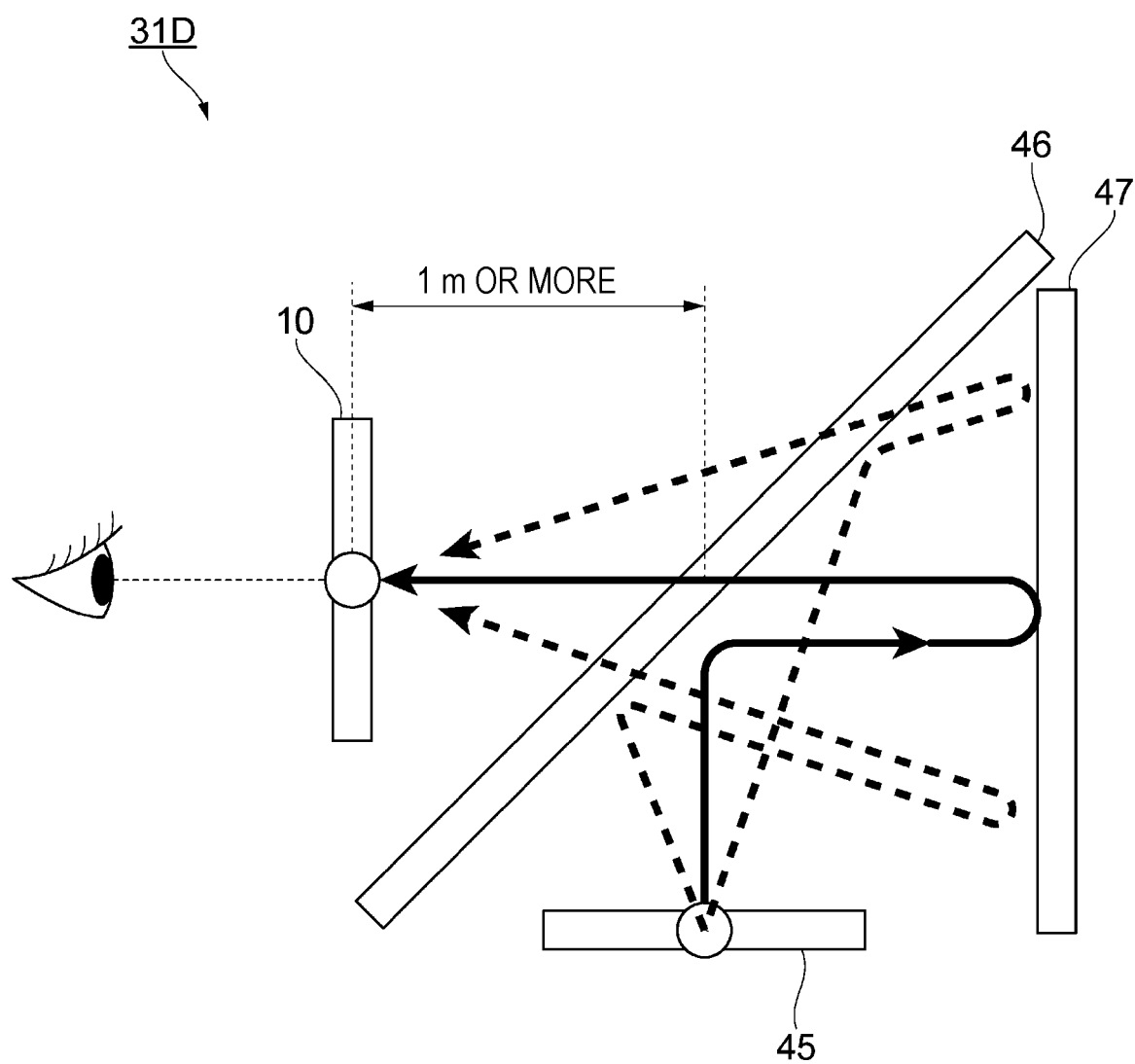
FIG. 5 is a principle diagram of an aerial-image forming apparatus equipped with a beam splitter and a retroreflector sheet.

FIG. 5 is a principle diagram of an aerial-image forming apparatus 31D equipped with a beam splitter 46 and a retroreflector sheet 47. The beam splitter 46 is disposed at an angle of 45° relative to the display face of a display device 45. The retroreflector sheet 47 is disposed at an angle of 90° relative to the display face of the display unit 45 in a direction in which the display image is reflected by the beam splitter 46.

In the case of the aerial-image forming apparatus 31D, light output from the display device 45 is reflected toward the retroreflector sheet 47 by the beam splitter 46, is subsequently retro-reflected by the retroreflector sheet 47, and is transmitted through the beam splitter 46, so that an image of the light is formed in midair. An aerial image 10 is formed at the position where the light is imaged.

Figure 6:
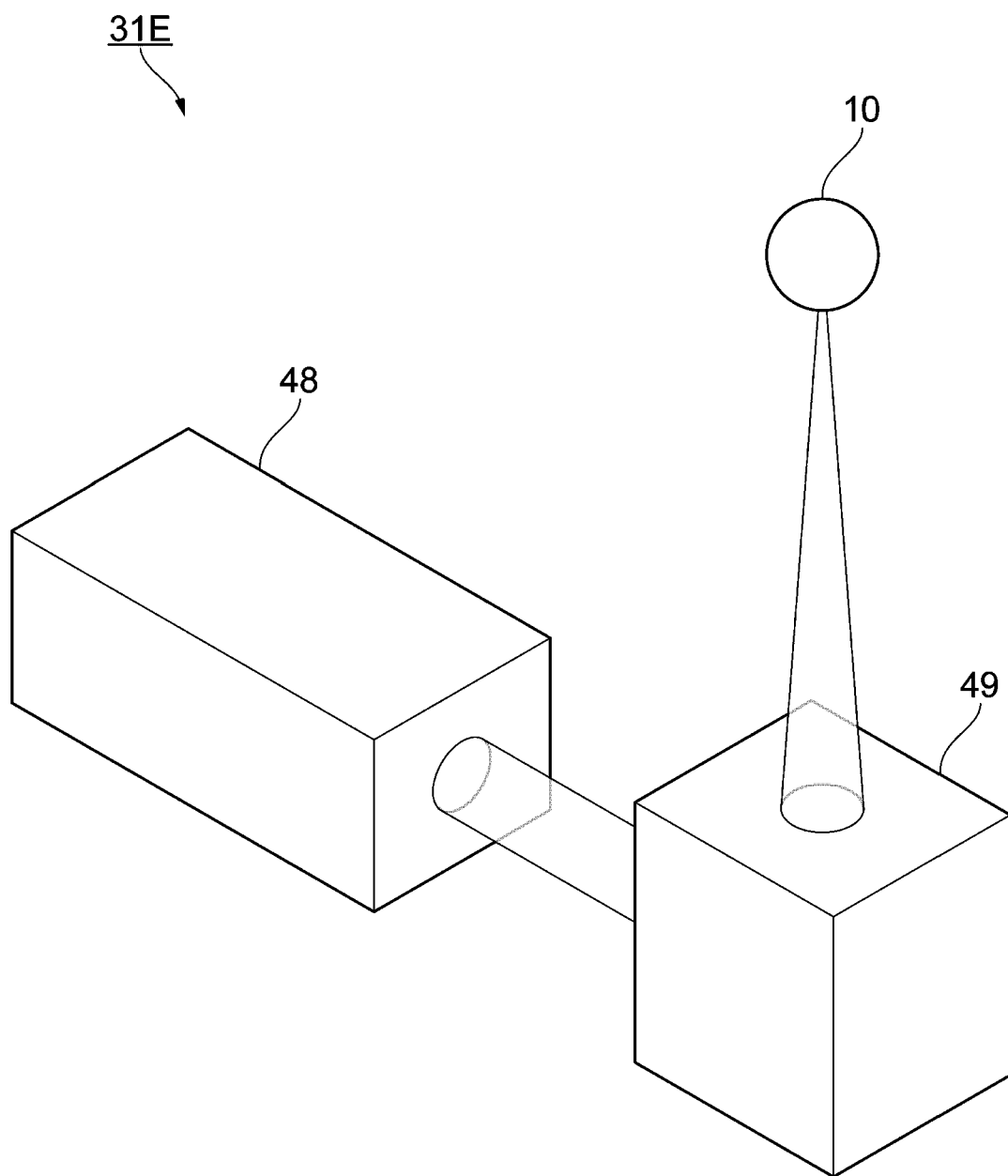
FIG. 6 is a principle diagram of an aerial-image forming apparatus that forms an aerial image as a group of plasma emission bodies.

FIG. 6 is a principle diagram of an aerial-image forming apparatus 31E that forms an aerial image 10 as a group of plasma emission bodies.

In the case of the aerial-image forming apparatus 31E, an infrared pulse laser 48 outputs a pulsed laser beam, and an XYZ scanner 49 focuses the pulsed laser beam in midair. In this case, gas near the focal point instantaneously becomes plasma and thus emits light.

The pulse frequency is, for example, 100 Hz or lower, and the pulse emission time is, for example, on the order of nanoseconds.

Configuration of Operation Reception Apparatus 32

Figure 7:
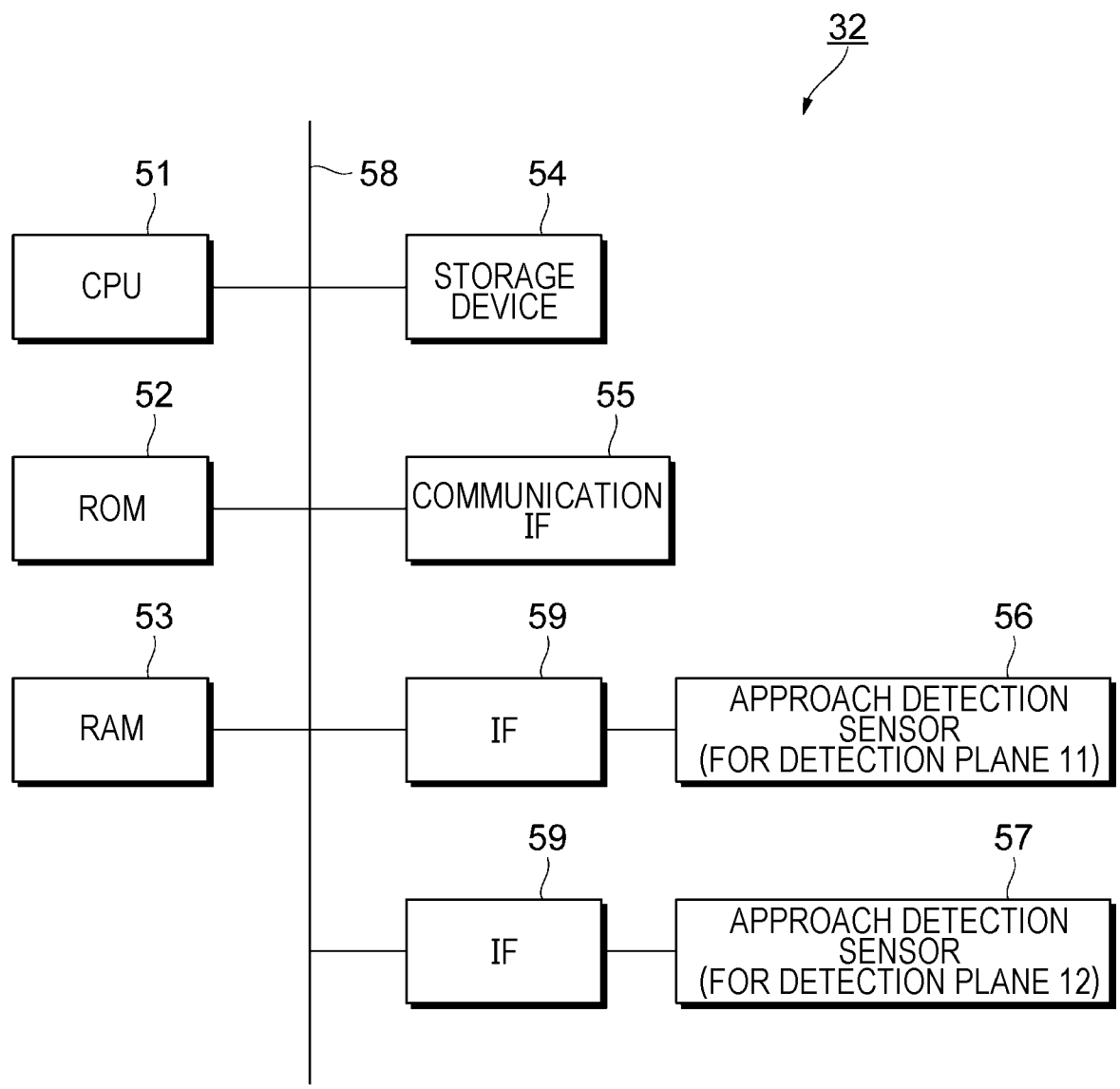
FIG. 7 illustrates an example of a hardware configuration of an operation reception apparatus according to the first exemplary embodiment.

FIG. 7 illustrates an example of a hardware configuration of the operation reception apparatus 32 according to the first exemplary embodiment.

The operation reception apparatus 32 includes a central processing unit (CPU) 51 that provides various types of functions by executing firmware and application programs, a read-only memory (ROM) 52 as a storage area that stores firmware and a basic input output system (BIOS), and a random access memory (RAM) 53 as an area where a program is executed. The CPU 51, the ROM 52, and the RAM 53 constitute an example of a computer.

The operation reception apparatus 32 has a storage device 54 that stores information to be displayed as an aerial image 10. The storage device 54 uses, for example, a rewritable nonvolatile storage medium for storing information.

The operation reception apparatus 32 controls the aerial-image forming apparatus 31 by using a communication interface (communication IF) 55, so as to change the image contents of the aerial image 10 in accordance with the contents of an operation.

Furthermore, the operation reception apparatus 32 includes an approach detection sensor 56 that detects whether or not there is an object passing through the detection plane 11 (see FIG. 1), and also includes an approach detection sensor 57 that detects whether or not there is an object passing through the detection plane 12 (see FIG. 1).

The approach detection sensors 56 and 57 may be disposed on the ceiling, on the floor, or on a side surface so long as the detection planes 11 and 12 are formable near the aerial image 10.

Each of the approach detection sensors 56 and 57 includes, for example, a light source (e.g., an infrared light emitting diode (LED)) that generates infrared light for forming a detection plane and an infrared light receiver that detects reflection light from an object passing through the detection plane.

The CPU 51 and each of the components are connected via a bus 58. The approach detection sensors 56 and 57 are connected to the bus 58 via an interface (IF) 59.

Figure 8:
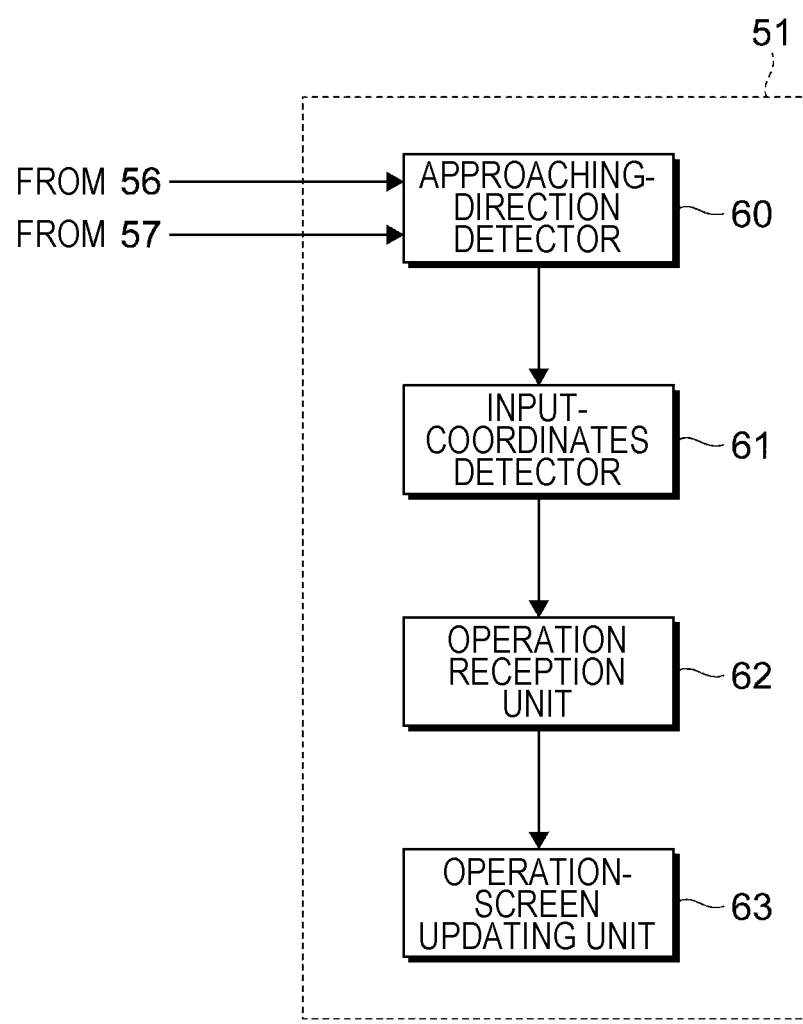
FIG. 8 illustrates an example of a functional configuration of the operation reception apparatus according to the first exemplary embodiment.

FIG. 8 illustrates an example of a functional configuration of the operation reception apparatus 32 (see FIG. 7) according to the first exemplary embodiment.

The functional configuration shown in FIG. 8 is realized by the CPU 51 executing a program.

The CPU 51 functions as an approaching-direction detector 60 that detects the direction in which a person approaches the aerial image 10 (see FIG. 1), an input-coordinates detector 61 that detects the coordinates where an input is detected, an operation reception unit 62 that receives an operation, and an operation-screen updating unit 63 that updates the operation screen in accordance with the received operation.

The approaching-direction detector 60 is an example of a detector, and the operation reception unit 62 is an example of a reception unit. The approach detection sensors 56 and 57 are also a part of the detector. Broadly speaking, the detection planes 11 and 12 related to the approach detection sensors 56 and 57 are also a part of the detector.

The approaching-direction detector 60 receives both an output signal from the approach detection sensor 56 and an output signal from the approach detection sensor 57, and uses the two output signals to detect the direction in which a person approaches the aerial image 10. In this exemplary embodiment, it is detected whether or not a person is approaching the aerial image 10 from the front side thereof.

In a case where a person is approaching the aerial image 10 from the front side thereof, the input-coordinates detector 61 detects the input coordinates from an output signal of an input-coordinates detection sensor (not shown). As mentioned above, the input-coordinates detection sensor may be served by one of or both of the approach detection sensors 56 and 57.

The operation reception unit 62 receives an operation in a case where a person approaches the aerial image 10 from a predetermined direction (i.e., from the front side of the aerial image 10) and a condition in which the action of the person is regarded as an operation is satisfied. Therefore, even when the approach is from the front side, if the person is simply passing through the aerial image 10, the operation reception unit 62 excludes the action of the person from an operation reception target.

Operation Reception Process

Next, a process executed by the operation reception apparatus 32 (see FIG. 1) for receiving an operation performed on the aerial image 10 (see FIG. 1) will be described.

Figure 9:
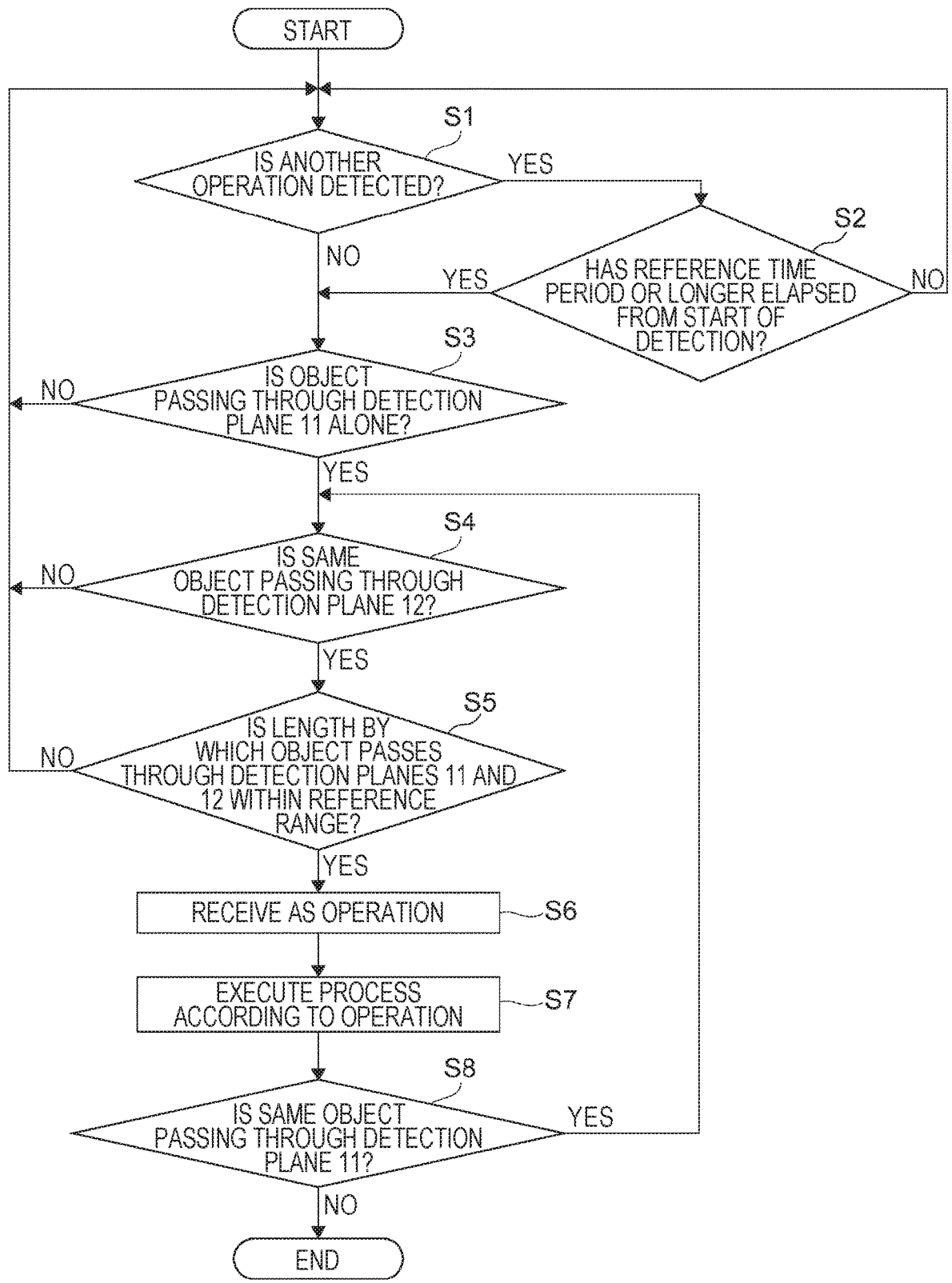
FIG. 9 illustrates an example of a flowchart explaining the contents of a process executed by the operation reception apparatus according to the first exemplary embodiment.

FIG. 9 illustrates an example of a flowchart explaining the contents of the process executed by the operation reception apparatus 32 according to the first exemplary embodiment. The contents of the process are provided by executing a program.

First, in step S1, the operation reception apparatus 32 determines whether or not another operation is detected. In the actual aerial image 10, multiple people approaching the aerial image 10 from the front side thereof may possibly operate the aerial image 10 one after another. However, it is not desirable that the display of the aerial image 10 be changed if an operation performed by another person is not completed.

If another operation is already detected (i.e., if a positive result is obtained in step S1), the operation reception apparatus 32 determines in step S2 whether or not a reference time period or longer has elapsed from the start of the detection.

If a negative result is obtained in step S2, the operation reception apparatus 32 returns to step S1.

If a negative result is obtained in step S1 (i.e., if another operation is not detected) or if a positive result is obtained in step S2 (i.e., if the reference time period or longer has elapsed from the detection of another operation), the operation reception apparatus 32 determines in step S3 whether or not an object is passing through the detection plane 11 alone. In other words, it is determined whether or not an object is passing through the detection plane 11 in a state where there is no object passing through the detection plane 12.

If a negative result is obtained in step S3, the operation reception apparatus 32 returns to step S1.

If a positive result is obtained in step S3, the operation reception apparatus 32 determines in step S4 whether or not the same object detected in step S3 is passing through the detection plane 12.

Whether the object is the same or not is determined by, for example, checking whether or not there is continuity between the position of the object passing through the detection plane 11 and the position of the object passing through the detection plane 12.

If a negative result is obtained in step S4, the operation reception apparatus 32 returns to step S1. In this case, although it is apparent that the approach is toward the front face of the aerial image 10 from the positional relationship between the detection plane 11 and the detection plane 12, it is not confirmed whether the approach is enough to be detected as an operation.

If a positive result is obtained in step S4 (i.e., in a case where an object passes through the detection plane 11 alone and the same object subsequently passes through the detection plane 12), the operation reception apparatus 32 determines in step S5 whether or not the length by which the object passes through the detection planes 11 and 12 is within a reference range.

In this case, for example, the length of a finger or the size of a hand is used as the reference range. By setting a lower limit for the reference range, a false detection of an object not used for an operation, such hair or an accessory, may be avoided.

If a negative result is obtained in step S5, the operation reception apparatus 32 returns to step S1. This is to exclude a case where an object passes through the aerial image 10 without intending to perform an operation.

If a positive result is obtained in step S5, the operation reception apparatus 32 receives the detection of the object passing through the detection planes 11 and 12 as an operation in step S6.

Then, in step S7, the operation reception apparatus 32 executes a process according to the operation.

Subsequently, in step S8, the operation reception apparatus 32 determines whether or not the same detected object is passing through the detection plane 11.

If a positive result is obtained in step S8, the operation reception apparatus 32 returns to step S4. If a positive result is obtained in step S4 after proceeding thereto from step S8, the operation reception apparatus 32 confirms continuation of the operation and proceeds to step S5. In contrast, if a negative result is obtained in step S4 after proceeding thereto from step S8, the operation reception apparatus 32 confirms that the operation is completed and that the finger or the hand is in the course of moving away from the aerial image 10, and then returns to step S1.

If a negative result is obtained in step S8, since there is no object passing through the detection plane 12, the operation reception apparatus 32 ends the process.

Figure 10:
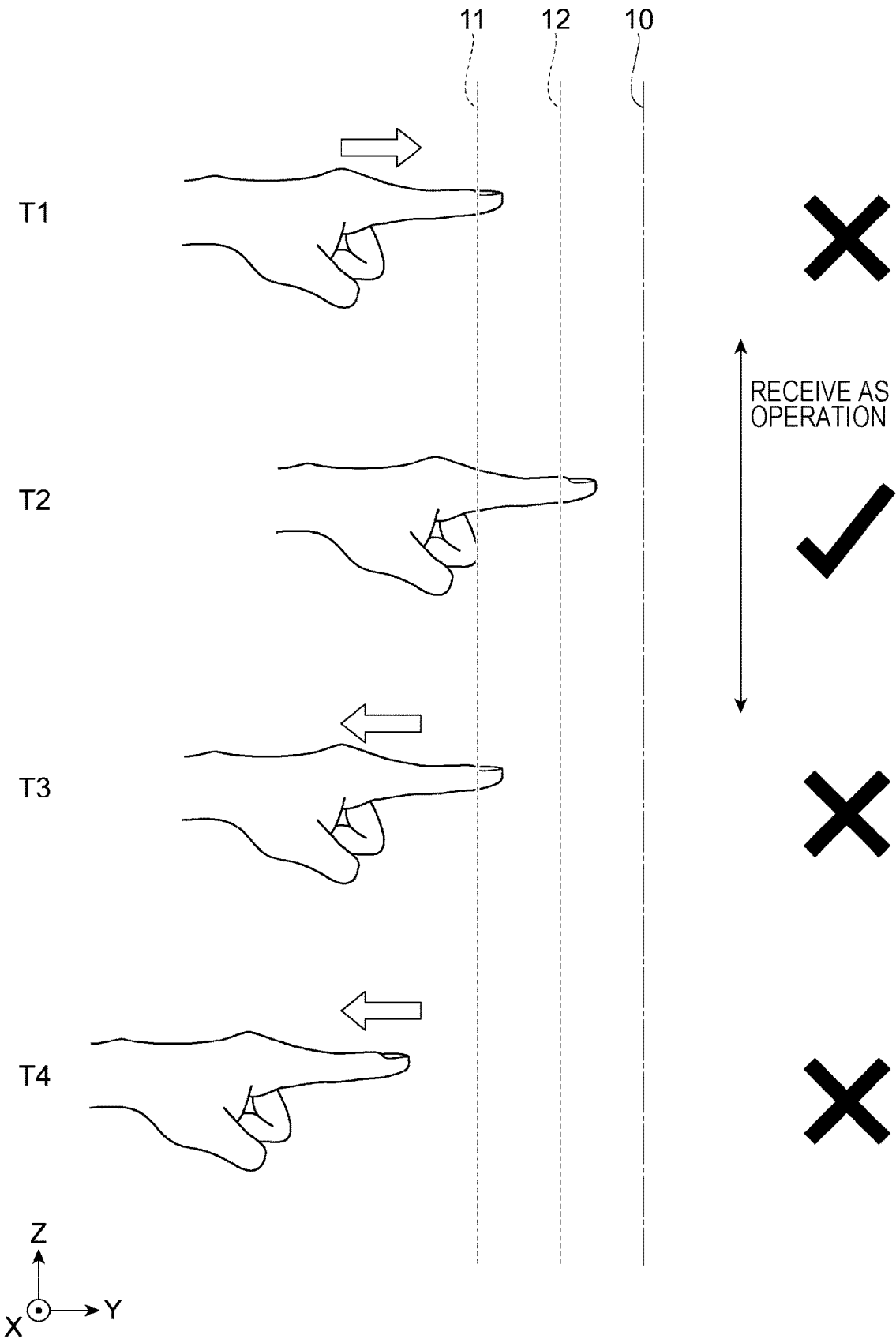
FIG. 10 is a diagram for explaining how a finger approaching an aerial image from the front side thereof is received as an operation in accordance with the first exemplary embodiment.

FIG. 10 is a diagram for explaining how a finger approaching the aerial image 10 from the front side thereof is received as an operation in accordance with the first exemplary embodiment.

FIG. 10 shows how the position of the finger changes over time. The detection plane 11 is provided at a position located away from the aerial image 10 by, for example, the length of a human finger. The distance from the aerial image 10 to the detection plane 11 is an example of a first distance. The detection plane 12 is provided at an intermediate position between the detection plane 11 and the aerial image 10. The meaning of the term "intermediate" in this case includes "between" but does not include "equal distance". The distance from the aerial image 10 to the detection plane 12 is an example of a second distance.

At a time point T1, the finger is passing through the detection plane 11 but not through the detection plane 12. This state corresponds to a state where a negative result is obtained in step S4 (see FIG. 9). Therefore, the action is not received as an operation.

At a time point T2, the finger is passing through the detection plane 12 after passing through the detection plane 11 alone. Specifically, the finger is passing through both of the detection plane 11 and the detection plane 12. This state corresponds to a state where a positive result is obtained in step S5 (see FIG. 9). Therefore, this state is received as an action for approaching the front face of the aerial image 10 to intentionally perform an operation.

At a time point T3, the finger is in the course of being pulled out and is passing through the detection plane 11 alone. This state corresponds to a state where a positive result is obtained in step S8 (see FIG. 9) and a negative result is subsequently obtained in step S4. Therefore, the action is not received as an operation.

At a time point T4, the finger has been pulled out. This state corresponds to a state where a negative result is obtained in step S8 (see FIG. 9). Therefore, the action is not received as an operation.

Figure 11:
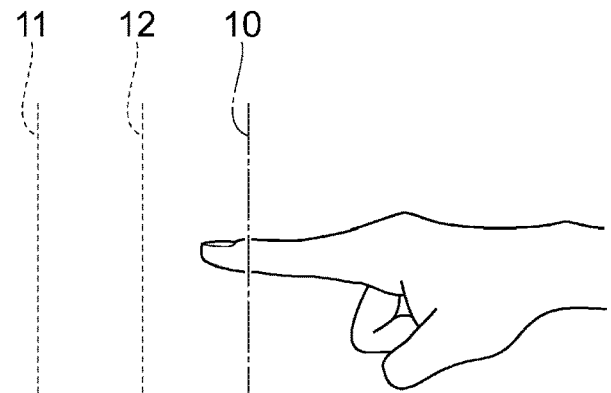
FIG. 11 is a diagram for explaining how a finger approaching an aerial image from the rear side thereof is received as an operation in accordance with the first exemplary embodiment.
Figure 11:
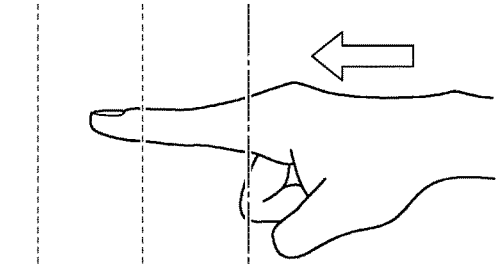
Figure 11:
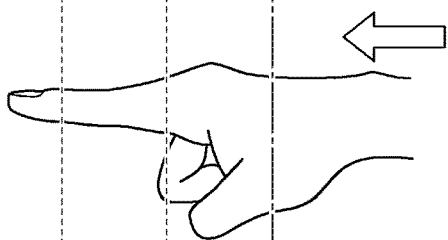

FIG. 11 is a diagram for explaining how a finger approaching the aerial image 10 from the rear side thereof is received as an operation in accordance with the first exemplary embodiment.

FIG. 11 shows how the position of the finger changes over time.

At a time point T11, the finger is passing through the aerial image 10 but is not passing through the detection planes 11 and 12. This state corresponds to a state where a negative result is obtained in step S3 (see FIG. 9). Therefore, the action is not received as an operation.

At a time point T12, the finger is passing through the aerial image 10 and the detection plane 12, but is not passing through the detection plane 11. This state corresponds to a state where a negative result is obtained in step S3 (see FIG. 9). Therefore, the action is not received as an operation.

At a time point T13, the finger is passing through all of the aerial image 10, the detection plane 11, and the detection plane 12. This state also corresponds to a state where a negative result is obtained in step S3 (see FIG. 9). Therefore, the action is not received as an operation.

Specifically, the approaching of the finger from the rear side of the aerial image 10 is different from the operation receiving direction assumed in the operation reception apparatus 32. Therefore, a condition in which a positive result is obtained in step S4 after a positive result is obtained in step S3 is not satisfied.

Thus, the approaching of the finger from the rear side that is not set as the operation receiving direction may be excluded from the operation target. As a result, passing of an object through the aerial image 10 from the rear side thereof is not detected as an operation, so that the display of the aerial image 10 may be prevented from changing.

Figure 12:
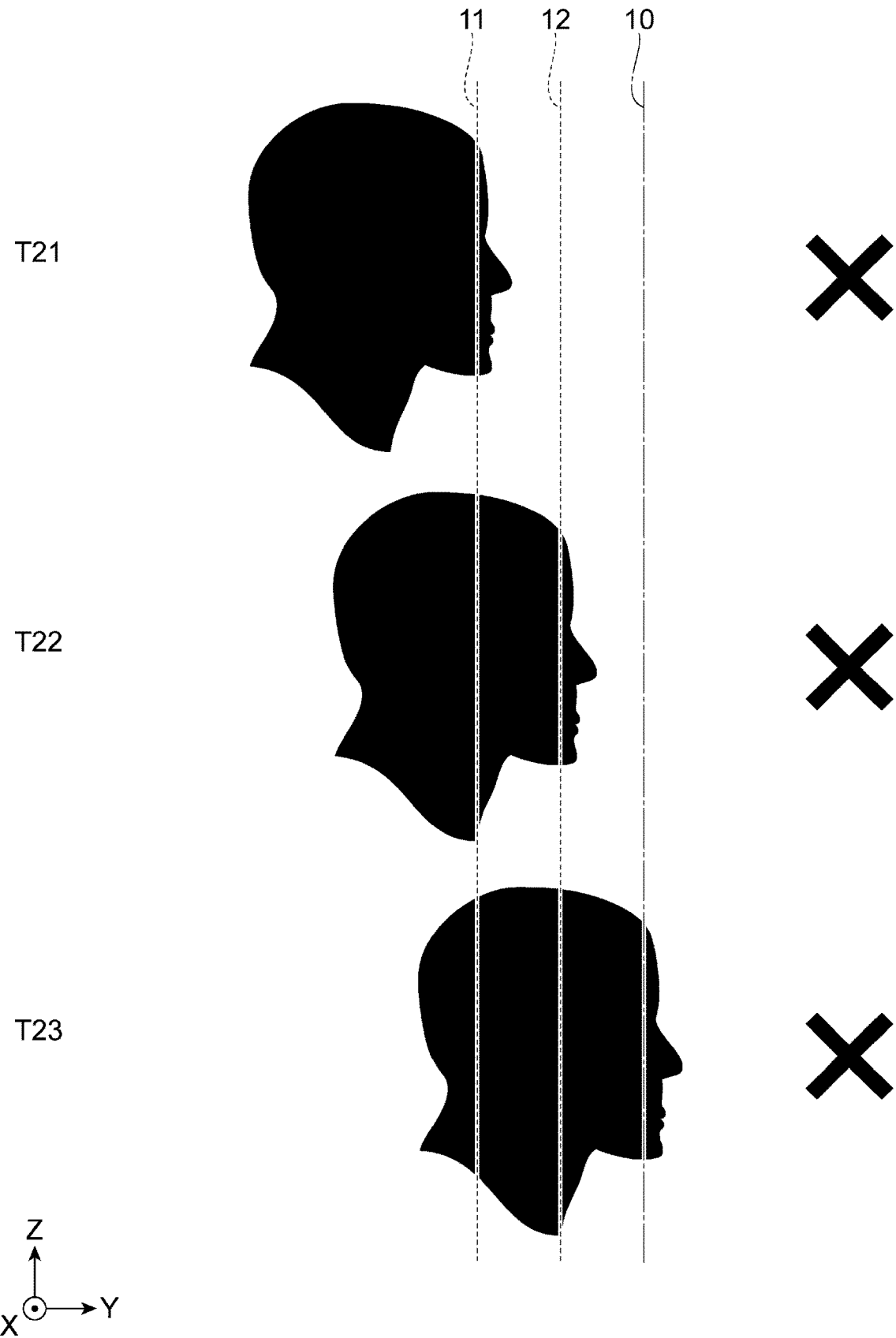
FIG. 12 illustrates a reception process in a case where a person passes through an aerial image from the front side thereof in accordance with the first exemplary embodiment.

FIG. 12 illustrates a reception process in a case where a person passes through the aerial image 10 from the front side thereof in accordance with the first exemplary embodiment.

FIG. 12 shows how a person approaching the aerial image 10 from the front side thereof passes through the aerial image 10.

At a time point 21, the person's nose is passing through the detection plane 11 but not through the detection plane 12. This state corresponds to a state where a negative result is obtained in step S4 (see FIG. 9). Therefore, the action is not received as an operation.

At time points T22 and T23, the person's head is passing through both of the detection planes 11 and 12. However, the size of the head exceeds the predetermined reference range. This state corresponds to a state where a negative result is obtained in step S5 (see FIG. 9).

Therefore, even when the approach is from the front side, the action is not received as an operation.

Accordingly, passing of an object not recognized as an intentional operation may be excluded from an operation reception target.

Figure 13:
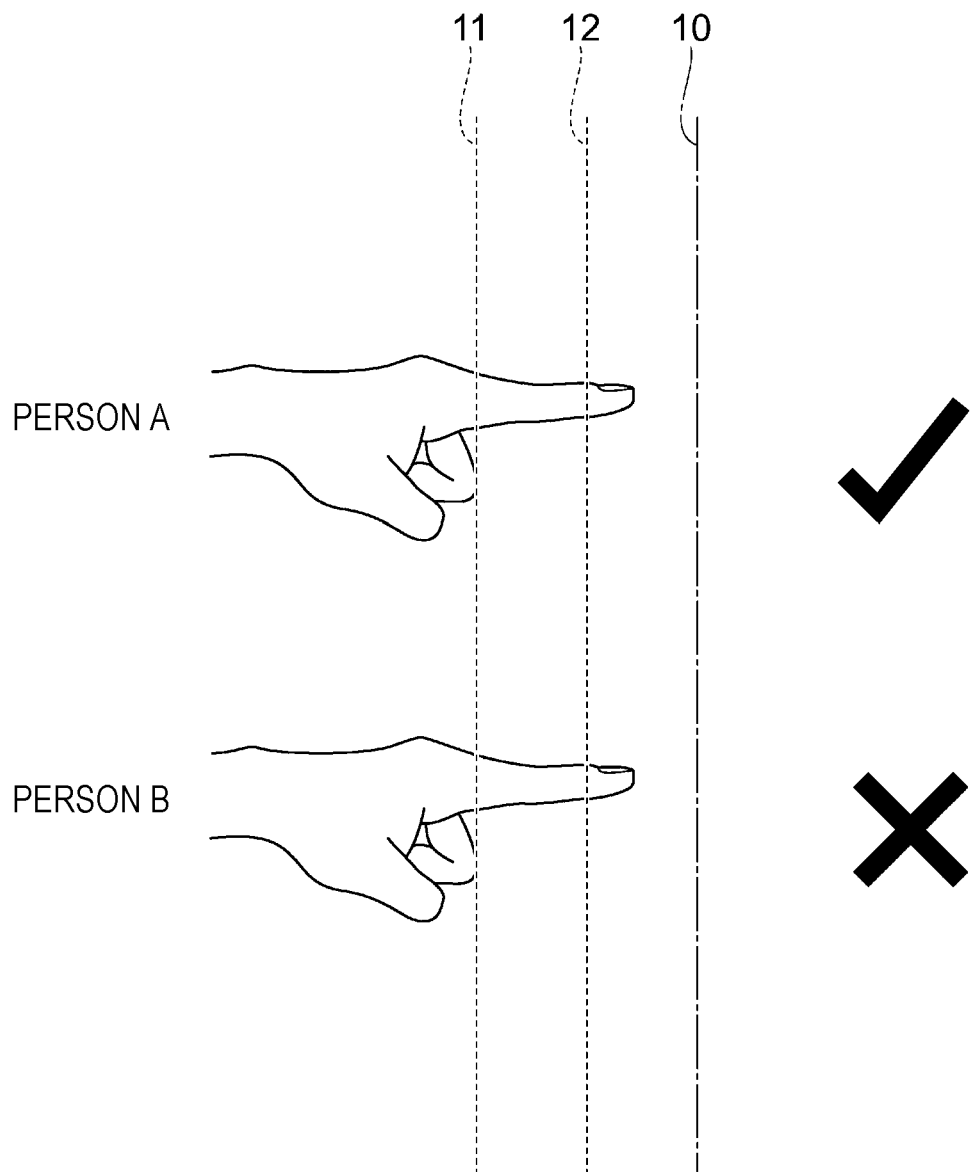
FIG. 13 illustrates a reception process in a case where a second person performs an operation while a first person is performing an operation, in accordance with the first exemplary embodiment.

FIG. 13 illustrates a reception process in a case where person B performs an operation while person A is performing an operation, in accordance with the first exemplary embodiment.

This case corresponds to a state where a negative result is obtained in step S1 (see FIG. 9) and in step S2 (see FIG. 9).

Therefore, only the operation performed by person A is received, whereas the operation performed by person B is excluded from the reception target.

Second Exemplary Embodiment

The following description relates to a case where approaching of a person carrying a specific device from the front side is selectively received as an operation.

The configuration of the aerial-image forming system 1 (see FIG. 1) used in the second exemplary embodiment and the hardware configuration of the operation reception apparatus 32 are the same as those in the first exemplary embodiment.

Figure 14:
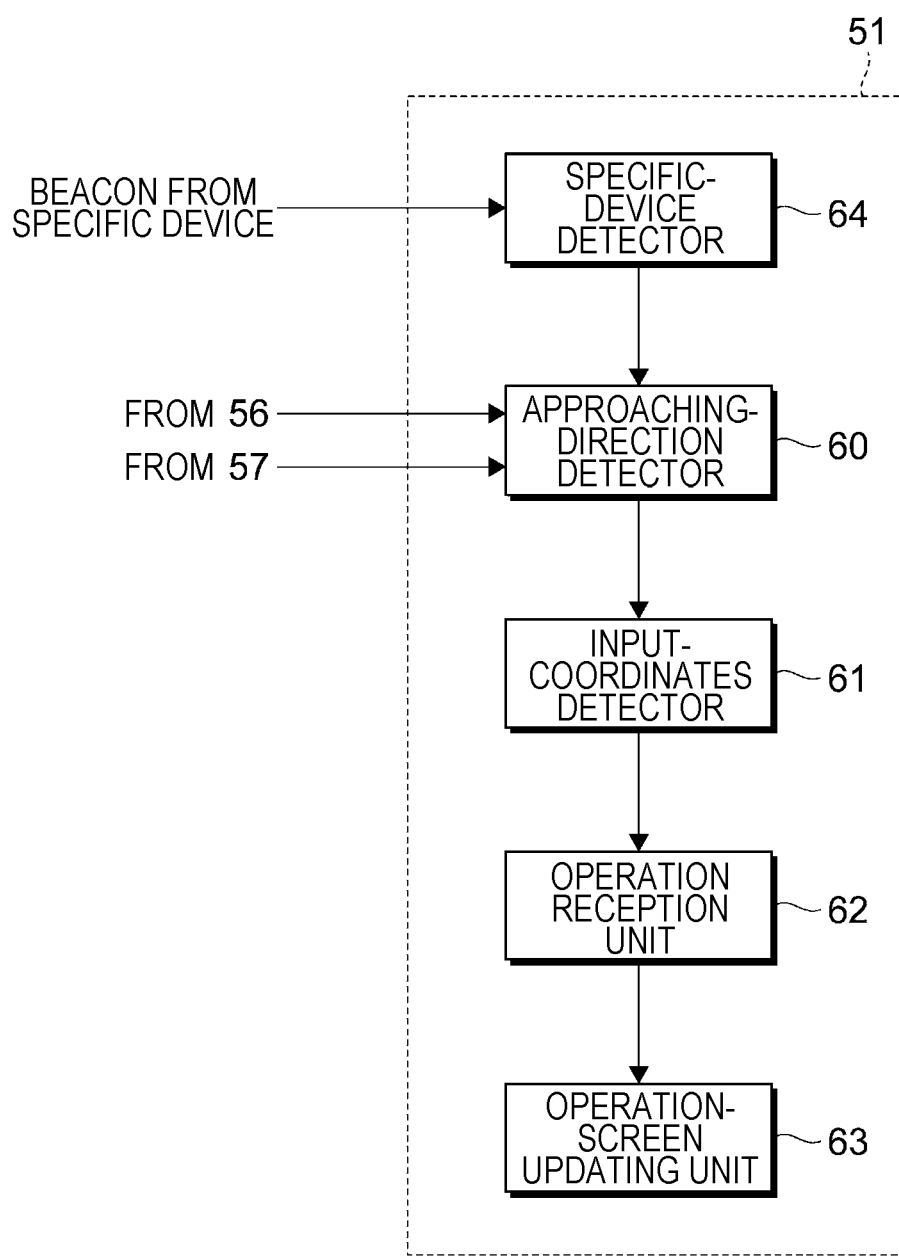
FIG. 14 illustrates an example of a functional configuration of an operation reception apparatus according to a second exemplary embodiment.

FIG. 14 illustrates an example of a functional configuration of the operation reception apparatus 32 (see FIG. 1) according to the second exemplary embodiment.

In FIG. 14, components corresponding to those in FIG. 8 are given the corresponding reference signs.

The operation reception apparatus 32 according to this exemplary embodiment differs from that in the first exemplary embodiment in having a specific-device detector 64 that detects whether or not an operator carries a specific device.

In this exemplary embodiment, an operation performed by a person carrying a specific device is selectively received, whereas an operation performed by a person not carrying a specific device is not received.

In this exemplary embodiment, a finger-ring-type terminal is assumed as the specific device. A finger-ring-type terminal is an example of a wearable terminal. A wearable terminal may alternatively be, for example, an eyeglasses-type terminal or a pen-type terminal.

A wearable terminal is also an example of a portable terminal.

In the case of this exemplary embodiment, for example, the specific-device detector 64 receives a beacon (electric wave) output from a finger-ring-type terminal and estimates the distance to the person wearing the finger-ring-type terminal. This technology is also called Bluetooth (registered trademark) positioning.

The specific-device detector 64 may use another indoor positioning technology or may use another indoor positioning technology in combination with the above technology.

By setting the reception of a signal from a specific device or communication therewith as a condition, the reception of an operation performed on the aerial image 10 may be limited. Alternatively, identification of a person based on authentication may be set as a condition.

Furthermore, by combining with a positioning technology, a person located away from the aerial image 10 (i.e., a person regarded as not having an intention of performing an operation) or a person approaching the aerial image 10 (i.e., a person regarded as having an intention of performing an operation) are distinguishable from each other.

Figure 15:
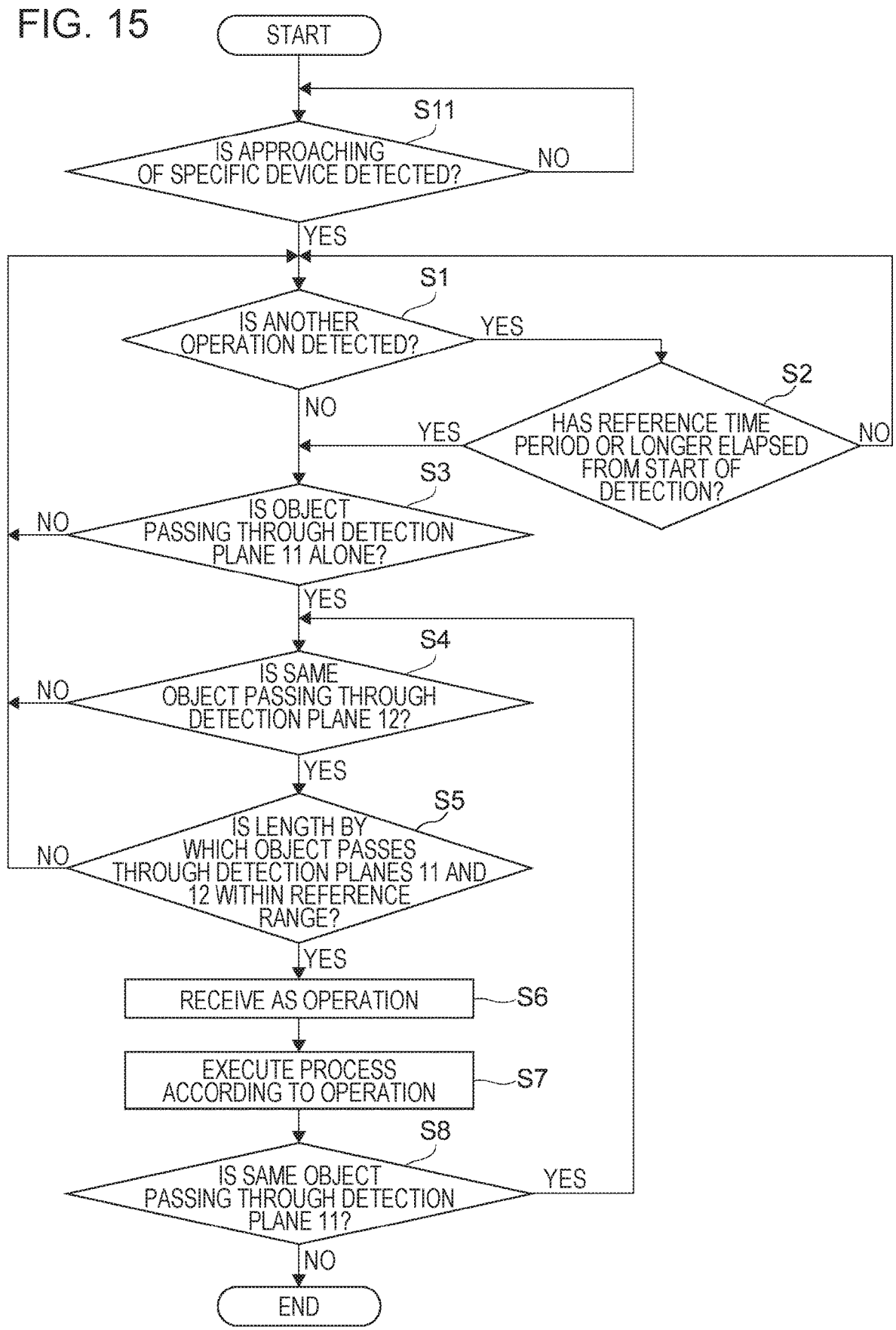
FIG. 15 is an example of a flowchart illustrating the contents of a process executed by the operation reception apparatus according to the second exemplary embodiment.

FIG. 15 is an example of a flowchart illustrating the contents of a process executed by the operation reception apparatus 32 (see FIG. 1) according to the second exemplary embodiment. The contents of the process are provided by executing a program.

In FIG. 15, components corresponding to those in FIG. 9 are given the corresponding reference signs.

This exemplary embodiment differs from the first exemplary embodiment in that step S11 for determining whether or not approaching of a specific device is to be detected is executed in the beginning of the process.

Since a negative result obtained in step S11 implies that there is no one from whom an operation is received, the determination process in step S11 is repeated.

When a positive result is obtained in step S11, the operation reception apparatus 32 proceeds to step S1 and executes the process described in the first exemplary embodiment.

Figure 16:
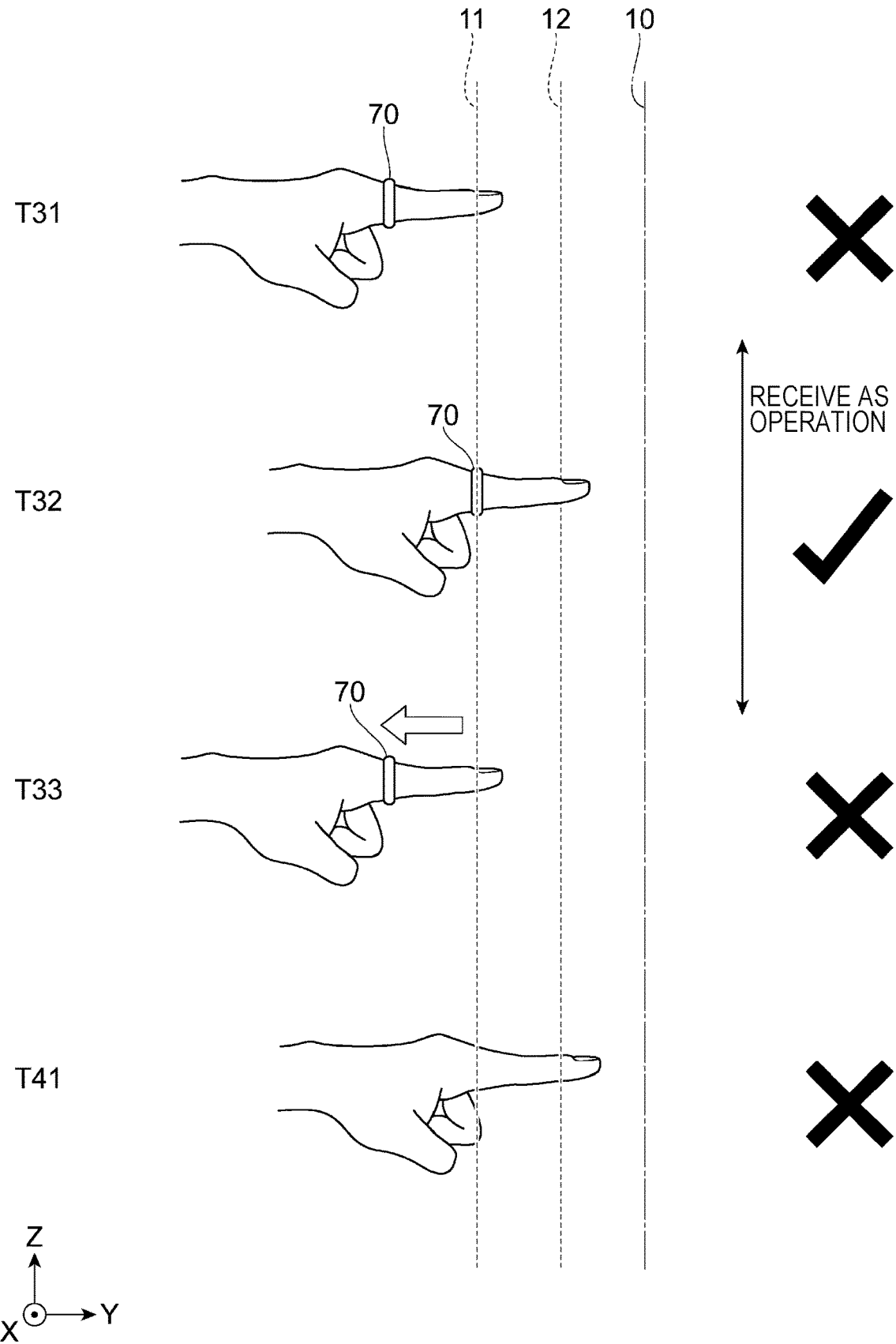
FIG. 16 is a diagram for explaining how a finger approaching an aerial image from the front side thereof is received as an operation in accordance with the second exemplary embodiment.

FIG. 16 is a diagram for explaining how a finger approaching the aerial image 10 from the front side thereof is received as an operation in accordance with the second exemplary embodiment.

In FIG. 16, components corresponding to those in FIG. 10 are given the corresponding reference signs.

FIG. 16 also shows how the position of the finger changes over time.

From time points T31 to T33, the finger wearing a finger-ring-type terminal 70 approaches the aerial image 10 from the front side thereof, and is subsequently pulled out.

At a time point T41, a finger not wearing the finger-ring-type terminal 70 is passing through both the detection planes 11 and 12 disposed in front of the aerial image 10.

In the case of the first exemplary embodiment, the time point T41 corresponds to a state where the action is received as an operation.

However, in this exemplary embodiment, an action to be received as an operation is limited to a person wearing the finger-ring-type terminal 70. Therefore, the action is received as an operation at the time point T32. Even if a finger is wearing the finger-ring-type terminal 70, the position of the finger at the time points T31 and T33 does not satisfy the operation reception condition described in the first exemplary embodiment.

Third Exemplary Embodiment

Figure 17:
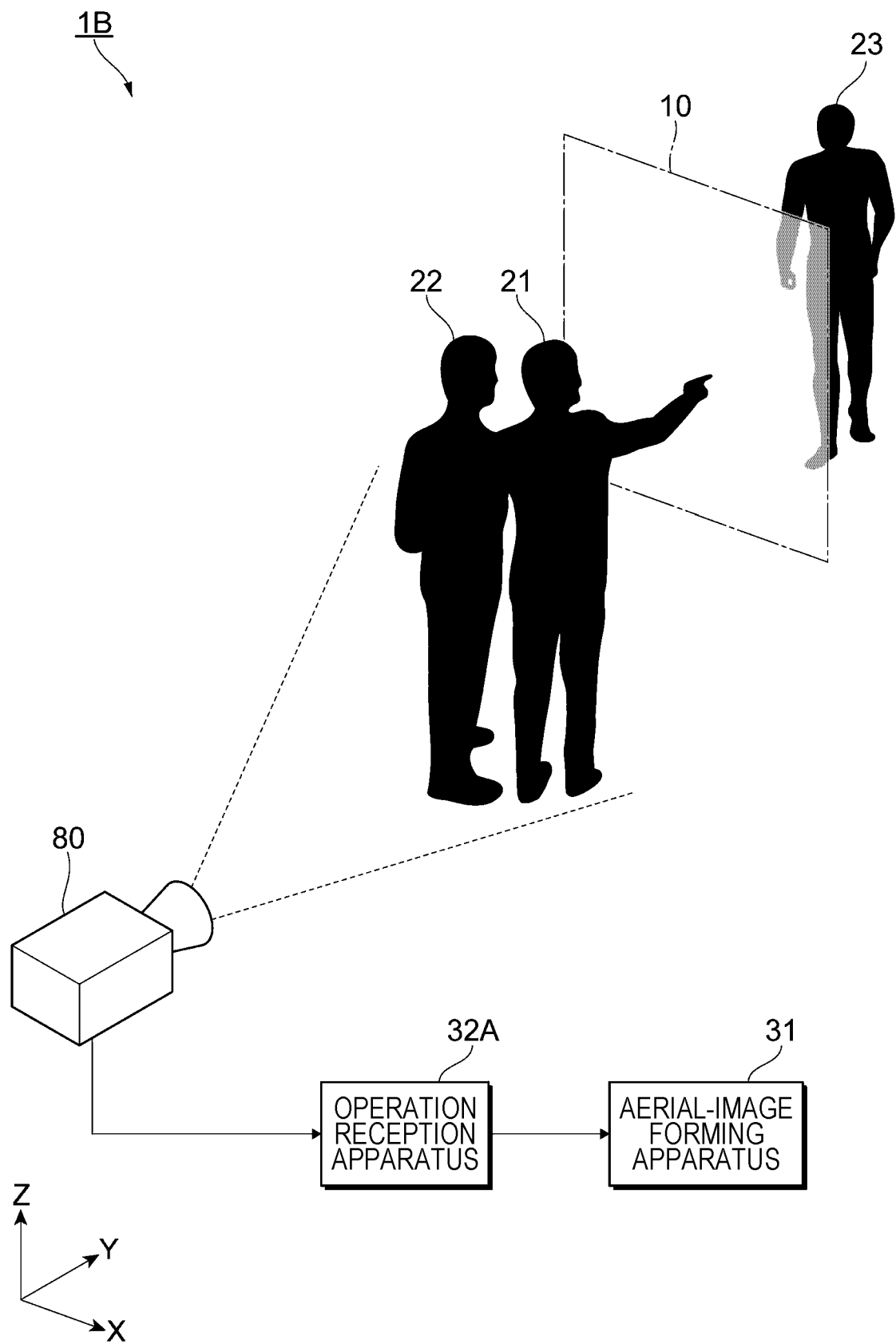
FIG. 17 schematically illustrates the configuration of an aerial-image forming system according to a third exemplary embodiment.

FIG. 17 schematically illustrates the configuration of an aerial-image forming system 1B according to a third exemplary embodiment.

In FIG. 17, components corresponding to those in FIG. 1 are given the corresponding reference signs.

In FIG. 17, a difference from the first exemplary embodiment is that an operation reception apparatus 32A is used for detecting the approaching direction by using a video image from an imaging camera 80.

The imaging camera 80 is an example of an imaging unit.

In the third exemplary embodiment, the detection plane 11 (see FIG. 1) and the detection plane 12 (see FIG. 1) are not used.

In this exemplary embodiment, the imaging camera 80 is disposed so as to photograph the front face of the aerial image 10. Therefore, the imaging camera 80 photographs the back of the head or the back of a person approaching the aerial image 10 from the front side thereof, and also photographs the face or the chest of a person approaching the aerial image 10 from the rear side thereof.

The hardware configuration of the operation reception apparatus 32A used in the third exemplary embodiment is the same as that in the first exemplary embodiment.

Figure 18:
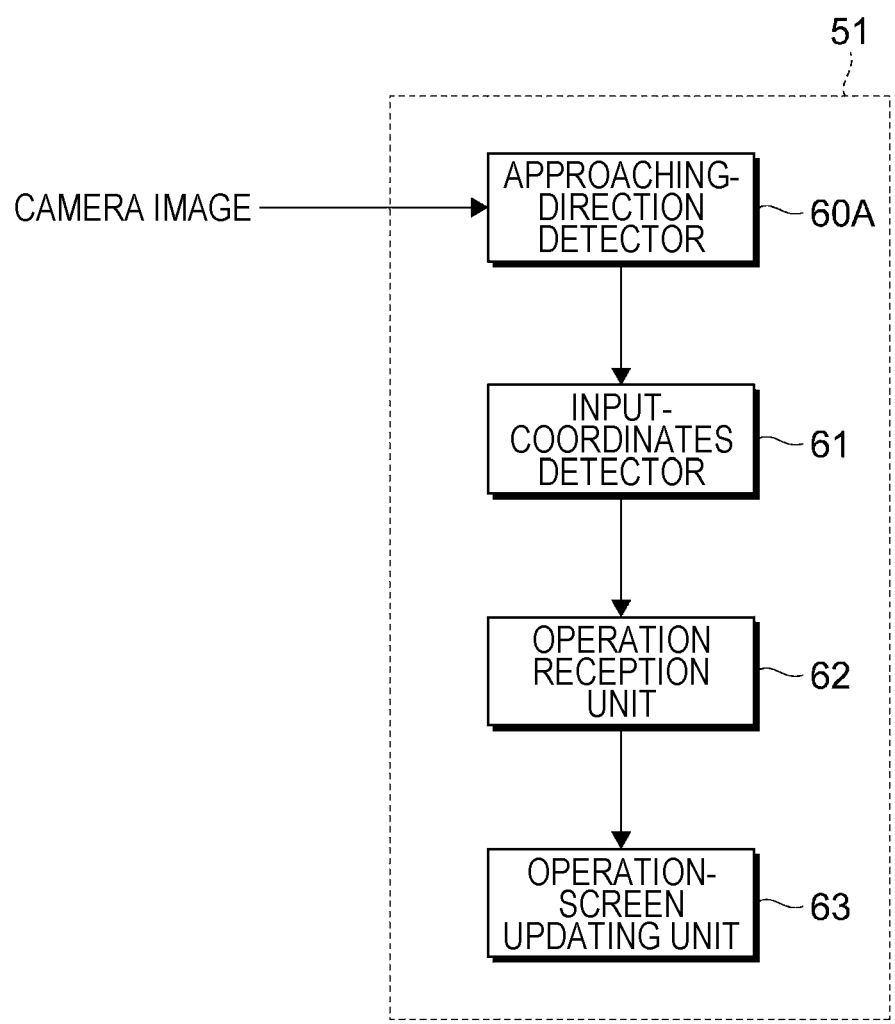
FIG. 18 illustrates an example of a functional configuration of an operation reception apparatus according to the third exemplary embodiment.

FIG. 18 illustrates an example of a functional configuration of the operation reception apparatus 32A according to the third exemplary embodiment.

In FIG. 18, components corresponding to those in FIG. 8 are given the corresponding reference signs.

This exemplary embodiment differs from the first exemplary embodiment in that an approaching-direction detector 60A that receives a camera image acquired by the imaging camera 80 is used.

As mentioned above, the approaching-direction detector 60A detects a person whose back of the head or back appears in the camera image and having an intention of performing an operation as a person approaching the aerial image 10, and detects a person whose face or chest appears in the camera image as a person not having an intention of performing an operation.

The approaching-direction detector 60A may alternatively determine whether or not a person is approaching the aerial image 10 in accordance with changes in the position of a subject imaged at multiple time points.

As another alternative, the approaching-direction detector 60A may determine the distance to a subject by using a camera image acquired such that blurriness or color misalignment occurs in accordance with the distance to the subject, and may determine whether or not a person serving as the subject is approaching the aerial image 10 from a temporal change in this distance.

Figure 19:
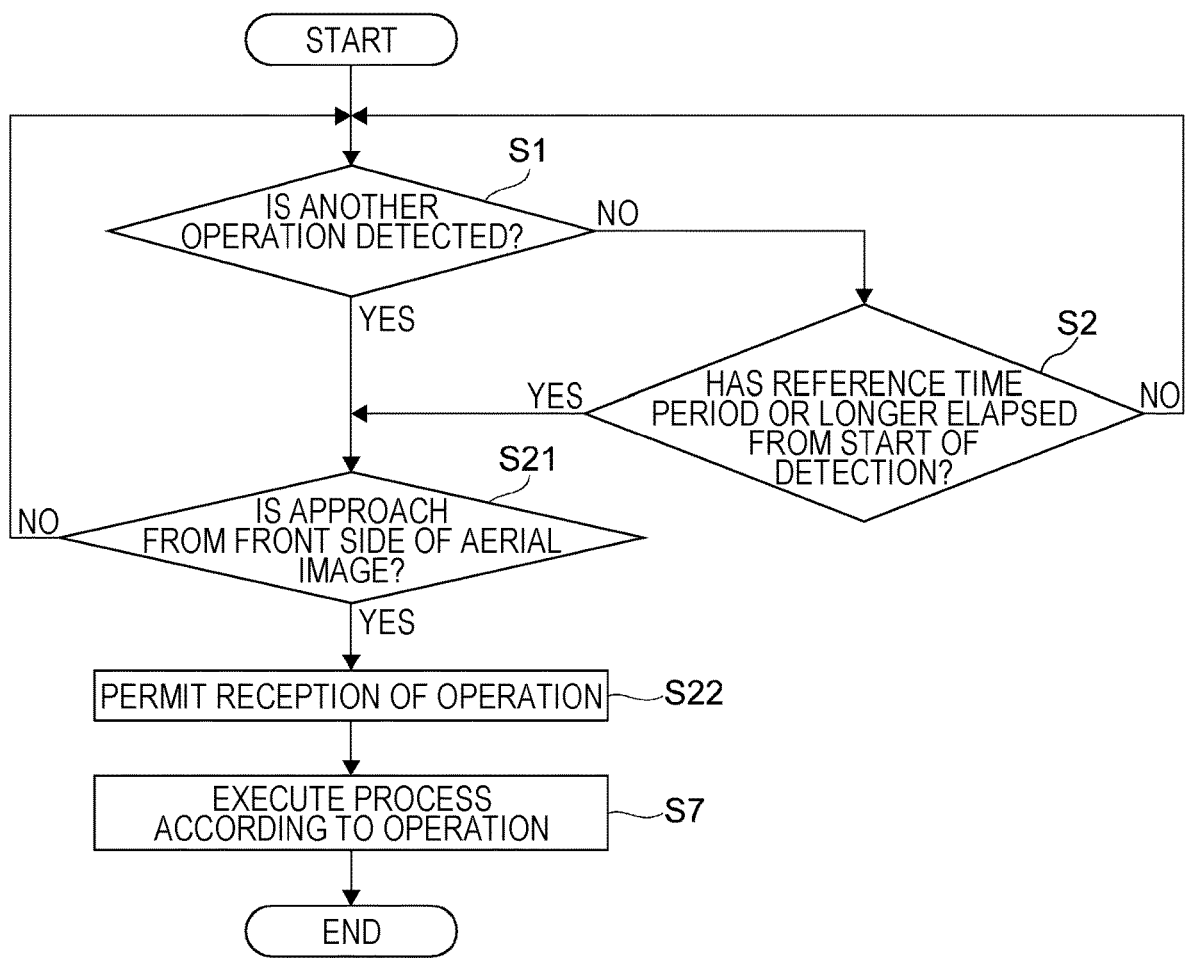
FIG. 19 illustrates an example of a flowchart explaining the contents of a process executed by the operation reception apparatus according to the third exemplary embodiment.

FIG. 19 illustrates an example of a flowchart explaining the contents of a process executed by the operation reception apparatus 32A (see FIG. 17) according to the third exemplary embodiment. The contents of the process are provided by executing a program.

In FIG. 19, components corresponding to those in FIG. 9 are given the corresponding reference signs.

In a case where a negative result is obtained in step S1 or a positive result is obtained in step S2, the operation reception apparatus 32A determines in step S21 whether or not the approach is from the front side of the aerial image 10.

If a negative result is obtained in step S21, the operation reception apparatus 32A returns to step S1.

If a positive result is obtained in step S21, the operation reception apparatus 32A permits reception of an operation in step S22 and executes a process according to the operation in step S7.

In this exemplary embodiment, a detector (not shown) that detects a position or region where a person operates the aerial image 10 is used. For example, another imaging camera that photographs a hand may be prepared, or a sensor that uses infrared light to detect the coordinates at which an object passes through a detection plane may be prepared.

Figure 20:
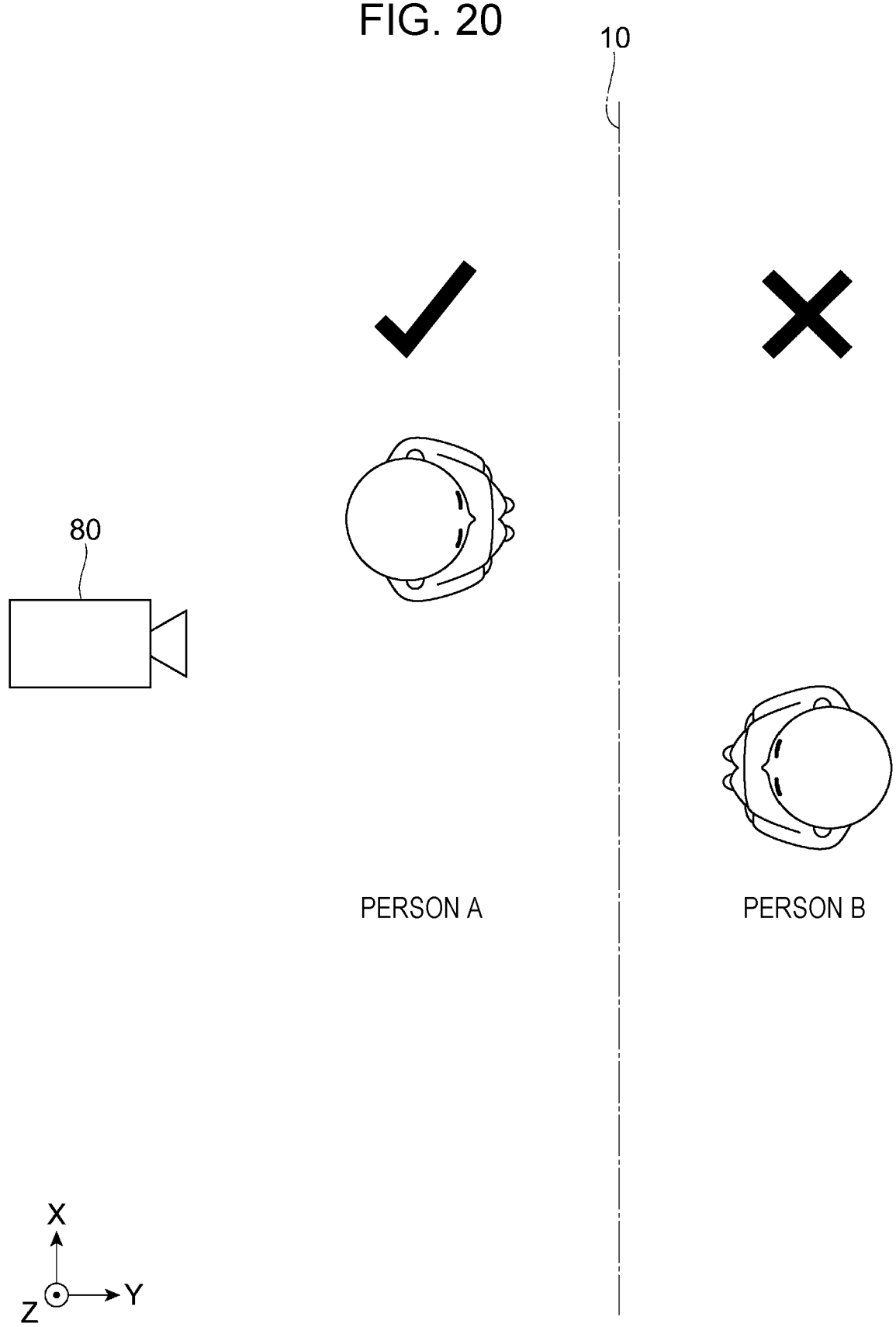
FIG. 20 illustrates a case where a person approaches an aerial image from the front side thereof and a case where a person approaches the aerial image from the rear side thereof, in accordance with the third exemplary embodiment.

FIG. 20 illustrates a case where a person approaches the aerial image 10 from the front side thereof and a case where a person approaches the aerial image 10 from the rear side thereof, in accordance with the third exemplary embodiment.

In this exemplary embodiment, reception of an operation is permitted with respect to person A whose back of the head is photographed by the imaging camera 80, whereas person B whose face is photographed by the imaging camera 80 is excluded from the operation reception target.

Fourth Exemplary Embodiment

Figure 21:
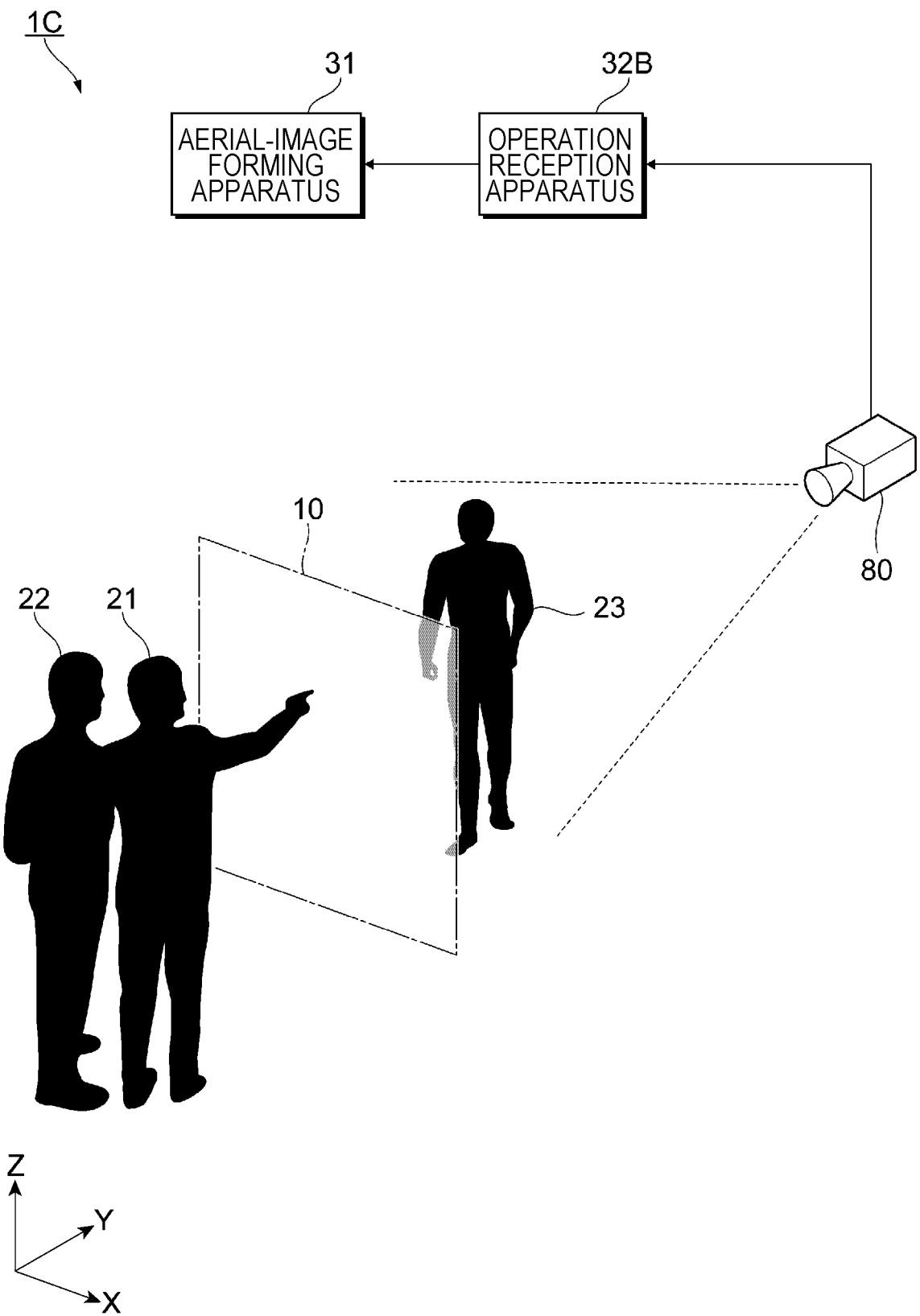
FIG. 21 schematically illustrates the configuration of an aerial-image forming system according to a fourth exemplary embodiment.

FIG. 21 schematically illustrates the configuration of an aerial-image forming system 1C according to a fourth exemplary embodiment.

In FIG. 21, components corresponding to those in FIG. 17 are given the corresponding reference signs.

In FIG. 21, a difference from the third exemplary embodiment is that an operation reception apparatus 32B is used for detecting the approaching direction by using a video image from the imaging camera 80.

In this exemplary embodiment, a difference from the third exemplary embodiment is that the photographing process is performed from the rear side of the aerial image 10.

In this exemplary embodiment, the imaging camera 80 photographs the face or chest of a person approaching the aerial image 10 from the front side thereof as an image viewable through the aerial image 10, and directly photographs the back of the head or the back of a person approaching the aerial image 10 from the rear side thereof.

The hardware configuration of the operation reception apparatus 32B used in the fourth exemplary embodiment is the same as that in the third exemplary embodiment.

Figure 22:
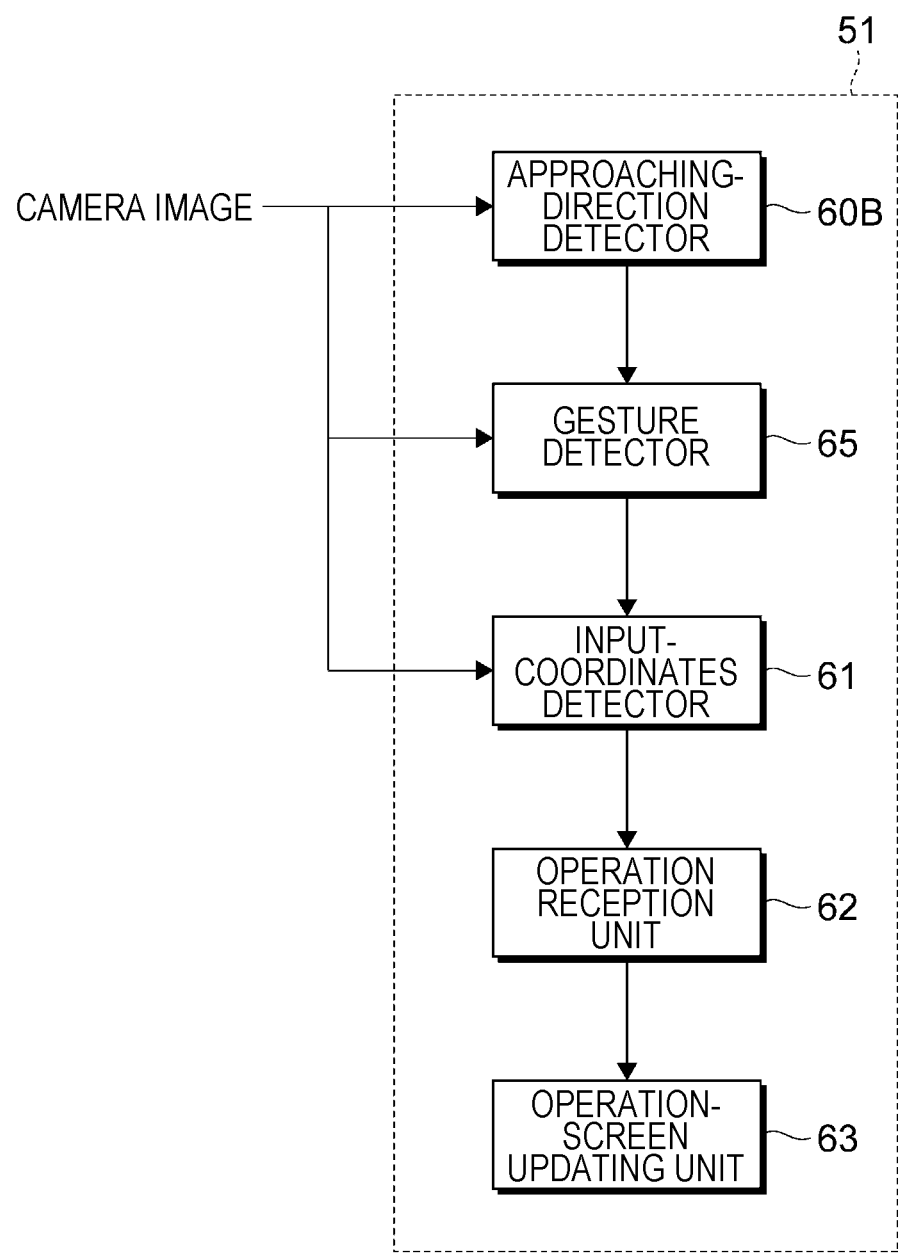
FIG. 22 illustrates an example of a functional configuration of an operation reception apparatus according to the fourth exemplary embodiment.

FIG. 22 illustrates an example of a functional configuration of the operation reception apparatus 32B according to the fourth exemplary embodiment.

In FIG. 22, components corresponding to those in FIG. 18 are given the corresponding reference signs.

In this exemplary embodiment, a difference from the third exemplary embodiment is that a camera image acquired by the imaging camera 80 is input to an approaching-direction detector 60B, a gesture detector 65 that detects a gesture of a person approaching the aerial image 10, and the input-coordinates detector 61.

As mentioned above, the approaching-direction detector 60B detects a person whose face or chest appears in a camera image through the aerial image 10 as a person having an intention of performing an operation, and detects a person whose back of the head or the back appears in the camera image as a person having no intention of performing an operation.

In this case, the approaching-direction detector 60B may alternatively determine whether or not a person is approaching the aerial image 10 in accordance with changes in the position of a subject imaged at multiple time points.

As another alternative, the approaching-direction detector 60B may determine the distance to a subject by using a camera image acquired such that blurriness or color misalignment occurs in accordance with the distance to the subject, and may determine whether or not a person serving as the subject is approaching the aerial image 10 from a temporal change in this distance.

The gesture detector 65 performs image processing to determine whether or not a characteristic gesture occurring when an operation is performed is included in the camera image. For example, a gesture of stretching a hand or a finger forward at the height of the face is detected as an operation. A gesture of bringing a hand down or carrying baggage is excluded from an operation target.

In this exemplary embodiment, the position of a hand of an operator is imaged through the aerial image 10 by the imaging camera 80. The input-coordinates detector 61 detects the position of the hand of the operator viewable through the aerial image 10 as input coordinates.

A process according to this exemplary embodiment is similar to that in the third exemplary embodiment.

Figure 23A:
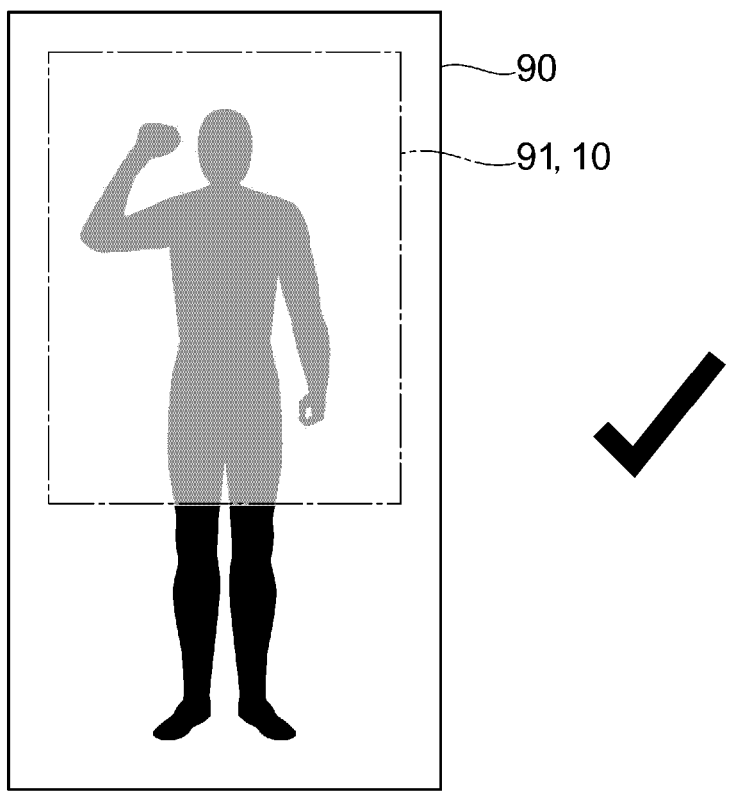
FIGS. 23A and 23B illustrate a case where approaching of a person toward an aerial image from the front side thereof is detected as an operation and a case where the approaching is not detected as an operation, FIG. 23A illustrating an example of a gesture detected as an operation, FIG. 23B illustrating an example of a gesture not detected as an operation.
Figure 23B:
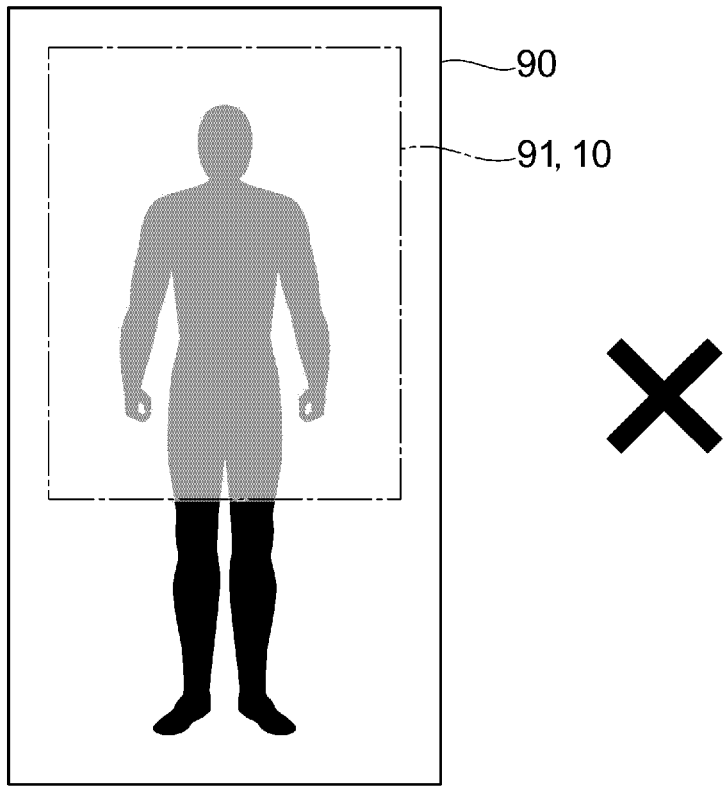

FIGS. 23A and 23B illustrate a case where approaching of a person toward the aerial image 10 from the front side thereof is detected as an operation and a case where the approaching is not detected as an operation. Specifically, FIG. 23A illustrates an example of a gesture detected as an operation, and FIG. 23B illustrates an example of a gesture not detected as an operation.

A camera image 90 includes a rectangular region 91 corresponding to the aerial image 10, and the face of a person appears through the rectangular region 91. Thus, the two examples shown in FIGS. 23A and 23B both indicate a case where a person approaches the aerial image 10 from the front side thereof.

However, the person illustrated in FIG. 23B has his/her hands down. Since this gesture does not occur when performing an operation, it is determined that this gesture is not an operation when the camera image 90 shown in FIG. 23B is acquired.

In contrast, a person illustrated in FIG. 23A has his/her right hand in a bent and lifted state. Since this gesture occurs when performing an operation, it is determined that this gesture is an operation when the camera image 90 shown in FIG. 23A is acquired.

Other Exemplary Embodiments

Although exemplary embodiments of the present invention have been described above, the technical scope of the present invention is not limited to the exemplary embodiments described above. It is obvious from the scope of the claims that various modifications and alterations of the above exemplary embodiments are included in the technical scope of the present invention.

In the above exemplary embodiments, the aerial image 10 as an operable plane is described as being planar. Alternatively, the above exemplary embodiments are applicable to a case where the aerial image 10 is formed three-dimensionally, as described above with respect to the aerial-image forming apparatus 31. In a case where the aerial image 10 is to be formed three-dimensionally, the detection planes 11 and 12 may be disposed at a predetermined side in the direction in which an operation is performed. In this case, the detection planes 11 and 12 are not parallel to the aerial image 10.

In the above exemplary embodiments, if another operation is detected, it is determined whether or not a subsequent operation is to be received with reference to the time elapsed from the start of the detection. Alternatively, the subsequent operation may be received based on a condition in which an object passing through both of the detection planes 11 and 12 is no longer detected. By limiting the action to be received as an operation in this manner, a false detection may be reduced.

In the above exemplary embodiments, the side at which text characters appear in the correct form is defined as the front face, and an approach toward the front face of the aerial image 10 is received as an operation. Alternatively, the operation receiving direction may be arbitrarily set.

For example, an approach toward the rear face of the aerial image 10 may be received as an operation. Furthermore, for example, an approach from the upper side, the lower side, or the lateral side of the aerial image 10 may be set as the operation receiving direction.

Furthermore, in a case where the aerial image 10 is a three-dimensional image, an approach from a specific direction alone may be received as an operation.

By setting the approaching direction to be received as an operation, operations to be received may be refined, thereby avoiding problems, such as reception of conflicted operations and instable response to an operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a detector that detects approaching of a user toward an image formed in midair; and a reception unit that receives an action of the user as an operation, in a case where the user approaches the image from a predetermined direction, wherein the detector includes a first sensor that generates infrared light to form a first detection region in front of the image and receives reflection light from an object passing through the first detection region, and a second sensor that generates infrared light to form a second detection region in front of the image and receives reflection light from an object passing through the second detection region, the first and second detection regions being separate from each other so as to detect an object separately from each other and being disposed away from the image by first and second predetermined distances, respectively;

the detector determines whether a same object passes through both of the first and second detection regions based on continuity of objects respectively detected in the first and second detection regions; and an action of the user is received as an operation on the image upon a determination that (i) the same object passes through both of the first and second detection regions and (ii) a length by which the same object passes through both of the first and second detection regions is within a predefined reference range.

2. The information processing apparatus according to claim 1, wherein the first detection region is located at the first predetermined distance from the image in the predetermined direction, and the second detection region is located at the second predetermined distance that is closer to the image than the first detection region.

3. The information processing apparatus according to claim 2, wherein the reception unit receives the action of the user as the operation in a case where a body part of the user passes through the second detection region after passing through the first detection region.

4. The information processing apparatus according to claim 2, wherein the first detection region and the second detection region are provided within a length of a finger of the user from the image.

5. The information processing apparatus according to claim 1, wherein the reception unit does not receive another action as the operation within a predetermined time period from the reception.

6. The information processing apparatus according to claim 5, wherein the reception unit does not receive another action as the operation until a body part of the user is no longer detected in both of the first detection region and the second detection region after the predetermined time period elapses, the first detection region being provided at the first predetermined distance from the image in the predetermined direction, the second detection region being provided at the second predetermined distance that is closer to the image than the first detection region.

7. The information processing apparatus according to claim 1, wherein the reception unit receives the action of the user carrying a portable terminal as the operation.

8. The information processing apparatus according to claim 7, wherein the portable terminal is a wearable terminal.

9. The information processing apparatus according to claim 8, wherein the portable terminal is a finger-ring-type terminal.

10. The information processing apparatus according to claim 1, wherein, in a case where a predetermined action is detected, the reception unit receives the action as the operation.

11. The information processing apparatus according to claim 10, wherein the predetermined action is an approach toward a predetermined region of the image.

12. The information processing apparatus according to claim 1, wherein the image is disposed in a passage in a passable mode from a plurality of directions.

13. An information processing system comprising:

an image forming apparatus that forms an image in midair;

a detector that detects approaching of a user toward the image; and a reception apparatus that receives an action of the user as an operation, in a case where the user approaches the image from a predetermined direction, wherein the detector includes a first sensor that generates infrared light to form a first detection region in front of the image and receives reflection light from an object passing through the first detection region, and a second sensor that generates infrared light to form a second detection region in front of the image and receives reflection light from an object passing through the second detection region, the first and second detection regions being separate from each other so as to detect an object separately from each other and being disposed away from the image by first and second predetermined distances, respectively;

the detector determines whether a same object passes through both of the first and second detection regions based on continuity of objects respectively detected in the first and second detection regions; and an action of the user is received as an operation on the image upon a determination that (i) the same object passes through both of the first and second detection regions and (ii) a length by which the same object passes through both of the first and second detection regions is within a predefined reference range.

14. A non-transitory computer readable medium storing a program causing a computer to execute a process, the process comprising:

forming an image in midair;

detecting, using a detector, approaching of a user toward the image; and receiving an action of the user as an operation, in a case where the user approaches the image from a predetermined direction, wherein the detector includes a first sensor that generates infrared light to form a first detection region in front of the image and receives reflection light from an object passing through the first detection region, and a second sensor that generates infrared light to form a second detection region in front of the image and receives reflection light from an object passing through the second detection region, the first and second detection regions being separate from each other so as to detect an object separately from each other and being disposed away from the image by first and second predetermined distances, respectively;

the detector determines whether a same object passes through both of the first and second detection regions based on continuity of objects respectively detected in the first and second detection regions; and an action of the user is received as an operation on the image upon a determination that (i) the same object passes through both of the first and second detection regions and (ii) a length by which the same object passes through both of the first and second detection regions is within a predefined reference range.

* * * * *